United States Patent

Kondo et al.

[11] Patent Number: 5,878,168
[45] Date of Patent: Mar. 2, 1999

[54] METHOD AND APPARATUS FOR PICTURE ENCODING AND DECODING

[75] Inventors: Tetsujiro Kondo; Yasuhiro Fujimori; Kenji Takahashi; Kunio Kawaguchi, all of Kanagawa, Japan

[73] Assignee: Sony Corporation, Tokyo, Japan

[21] Appl. No.: 658,863

[22] Filed: May 31, 1996

[30] Foreign Application Priority Data

Jun. 5, 1995 [JP] Japan ................................ 7-161421

[51] Int. Cl.⁶ .................................................. G06K 9/36
[52] U.S. Cl. ........................ 382/232; 382/238; 382/248; 382/250; 348/421; 348/422
[58] Field of Search ................................ 382/232, 233, 382/248, 239, 250, 238; 386/112, 124, 422, 412, 421; 348/409; 358/426, 430, 433

[56] References Cited

U.S. PATENT DOCUMENTS

| | | | |
|---|---|---|---|
| 4,903,124 | 2/1990 | Hoshi et al. | 348/422 |
| 5,038,389 | 8/1991 | Mizuno | 382/248 |
| 5,070,402 | 12/1991 | Ishii et al. | 348/421 |
| 5,166,987 | 11/1992 | Kageyama | 382/250 |
| 5,253,122 | 10/1993 | Chiba et al. | 386/112 |

*Primary Examiner*—Jose L. Couso
*Assistant Examiner*—Anh Hong Do
*Attorney, Agent, or Firm*—Frommer Lawrence & Haug, LLP.; William S. Frommer

[57] ABSTRACT

A picture encoding apparatus for encoding an input digital picture signal in such a manner that the amount of generated data is reduced is disclosed, that comprises a dividing unit for dividing the input digital picture signal into blocks each of which is composed of a plurality of pixels, a detecting unit for detecting the maximum value of the pixels of each block, the minimum value thereof, and a dynamic range that is the difference between the maximum value and the minimum value, a quantizing unit for quantizing each value of the pixels that has been normalized with the value of the dynamic range, and an additional code encoding unit for generating the difference of the minimum value with the minimum value and a delayed value of the minimum value and for variable-length code encoding the difference of the minimum value.

12 Claims, 14 Drawing Sheets

METHOD AND APPARATUS FOR PICTURE ENCODING AND DECODING

BACKGROUND OF THE INVENTION

1. Field of the Invention

The present invention relates to a highly efficient encoding method for encoding a digital picture signal and compressing the data amount thereof and a decoding apparatus for decoding the compressed digital picture signal into the original digital picture signal. In particular, the present invention relates to an encoding method for encoding a digital picture signal and transmitting additional information along with the encoded information, a picture encoding apparatus, a picture encoding and transmitting method, a picture recording medium, a picture decoding method, and a picture decoding apparatus.

2. Description of Related Art

FIG. 1 is a block diagram showing an example of a picture signal encoding apparatus that compresses a digital picture signal. The picture signal encoding apparatus shown in FIG. 1 is an encoding apparatus corresponding to an adaptive dynamic range encoding method (hereinafter referred to as the ADRC method). In the ADRC method, an input picture signal is divided into blocks each of which is composed of a predetermined number of pixels. Pixels of each block are adaptively encoded corresponding to the dynamic range of the block. The ADRC method has been proposed by the applicant of the present patent application as U.S. Pat. No. 4,703,352, issued on Oct. 27, 1987. Next, with reference to FIG. 1, the ADRC method will be briefly described. An input picture signal is supplied from an input terminal 1 to a block dividing portion 2. For example, each block composed of nine pixels of 3 pixels×3 lines (hereinafter referred to as a block of (3×3) pixels) is supplied to a maximum value detecting portion 3 and a minimum value detecting portion 4. The maximum value detecting portion 3 detects the maximum value MAX of the pixel values of the block. The minimum value detecting portion 4 detects the minimum value MIN of the pixel values of the block. The maximum value MAX is supplied from the maximum value detecting portion 3 to a subtracting portion 5. The minimum value MIN is supplied from the minimum value detecting portion 4 to the subtracting portion 5, a subtracting portion 6, and a framing portion 15. The subtracting portion 5 subtracts the minimum value MIN from the maximum value MAX and generates a dynamic range DR. The dynamic range DR is supplied from the subtracting portion 5 to a quantizing step width calculating portion 7 and the framing portion 15. The quantizing step width calculating portion 7 calculates a quantizing step width Δ corresponding to the dynamic range DR supplied from the subtracting portion 5. The calculated quantizing step width Δ is supplied to a quantizing portion 8.

Nine pixels of a block of (3×3) pixels are supplied from the input terminal 1 to the subtracting portion 6. By subtracting the minimum value MIN from the pixel values of the nine pixels, these pixel values are normalized. The normalized pixel values are supplied to the quantizing portion 8. The quantizing portion 8 quantizes each of the normalized pixel values with the quantizing step width Δ and supplies the resultant values as quantized values q to the framing portion 15. The framing portion 15 frames the dynamic range DR, the minimum value MIN, and the nine quantized values q and outputs the framed signal as an output signal. The output signal is recorded on a recording medium such as a disc or transmitted through a transmission line.

FIG. 2 is a block diagram showing an example of a picture signal decoding apparatus that decodes a digital picture signal that has been encoded by the ADRC encoding apparatus shown in FIG. 1. A signal reproduced from a recording medium or a signal supplied through a transmission line is supplied from an input terminal 30 to a deframing portion 34. The deframing portion 34 deframes the input signal that has been framed for each block into a dynamic range DR, a minimum value MIN, and nine quantized values q. The deframing portion 34 supplies the dynamic range DR and the quantized values q to a decoding portion 41. In addition, the deframing portion 34 supplies the minimum value MIN to an adding portion 42. The decoding portion 41 dequantizes the nine quantized values q corresponding to the dynamic range DR and supplies the dequantized values to the adding portion 42. The adding portion 42 adds the maximum value MAX to the dequantized values and thereby decodes the nine pixel values of the block of (3×3) pixels. The nine decoded pixel values are supplied to a time sequence converting portion 43. The time sequence converting portion 43 converts the decoded pixel values of blocks into pixel values of time sequence.

In the conventional ADRC method, pixel values of each block are quantized with a quantizing step width corresponding to a dynamic range so as to compress pixel values. However, important data that is the minimum value MIN and the dynamic range DR that are transmitted along with compressed pixel values is not compressed, but simply transmitted.

However, each pixel value of a digital picture signal is represented by eight bits that have 256 tones. When each pixel value of eight bits is encoded, the important data of the minimum value MIN and the dynamic range DR is represented by 16 bits per block. In other words, each of the minimum value MIN and the dynamic range DR is represented by eight bits. Thus, in this case, since the important data of the minimum value MIN and the dynamic range DR is not compressed, a high picture compression that has been desired cannot be accomplished.

OBJECT AND SUMMARY OF THE INVENTION

Therefore, an object of the present invention is to provide a picture encoding method, a picture encoding apparatus, a picture transmitting method, a picture recording medium, a picture decoding method for decoding the compressed important data, and a picture decoding apparatus, each of which compresses important data along with a picture signal so as to accomplish a high compression of a picture signal and restore a picture signal with a high picture quality equivalent to a conventional picture signal of which the important data is not compressed.

Another object of the present invention is to provide a picture encoding method, a picture encoding apparatus, a picture transmitting method, a picture recording medium, a picture decoding method for decoding the compressed important data, and a picture decoding apparatus, each of which compresses a difference signal of important data corresponding to the correlation of the important data of adjacent blocks so as to accomplish a high compression of a picture signal and restores a picture signal with a picture quality equivalent to a conventional picture signal of which the important data is not compressed.

To solve the above described problem, a first aspect of the present invention is a picture encoding apparatus for encoding an input digital picture signal in such a manner that the amount of generated data is reduced, comprising a dividing unit for dividing the input digital picture signal into blocks each of which is composed of a plurality of pixels, a detecting unit for detecting the maximum value of the pixels of each block, the minimum value thereof, and a dynamic range that is the difference between the maximum value and the minimum value, a quantizing unit for quantizing each value of the pixels that has been normalized with the value of the dynamic range, and an additional code encoding unit for generating the difference of the minimum value with the minimum value and a delayed value of the minimum value and for variable-length code encoding the difference of the minimum value.

A second aspect of the present invention is a picture encoding apparatus for encoding an input digital picture signal in such a manner that the amount of generated data is reduced, comprising a dividing unit for dividing the input digital picture signal into blocks each of which is composed of a plurality of pixels, a detecting unit for detecting the maximum value of the pixels of each block, the minimum value thereof, and a dynamic range that is the difference between the maximum value and the minimum value, a quantizing unit for quantizing each value of the pixels that has been normalized with the value of the dynamic range, a first additional code encoding unit for generating the difference of the maximum value with the maximum value and a delayed value of the maximum value and for variable-length code encoding the difference of the maximum value, and a second additional code encoding unit for generating the difference of the minimum value with the minimum value and a delayed value of the minimum value and for variable-length code encoding the difference of the minimum value.

A third aspect of the present invention is a picture encoding apparatus for encoding an input digital picture signal in such a manner that the amount of generated data is reduced, comprising a dividing unit for dividing the input digital picture signal into blocks each of which is composed of a plurality of pixels, a detecting unit for detecting the maximum value of the pixels of each block, the minimum value thereof, and a dynamic range that is the difference between the maximum value and the minimum value, a quantizing unit for quantizing each value of the pixels that has been normalized with the value of the dynamic range, and an additional code encoding unit for generating the difference of the maximum value with the maximum value and a delayed value of the maximum value and for variable-length code encoding the difference of the maximum value.

A fourth aspect of the present invention is a picture encoding apparatus for encoding an input digital picture signal in such a manner that the amount of generated data is reduced, comprising a dividing unit for dividing the input digital picture signal into blocks each of which is composed of a plurality of pixels, a generating unit for generating a predicted value of additional information with coefficients that correspond to additional information generated for each block and that have been learnt and additional information of each block, an additional code encoding unit for generating the difference of the additional information with the additional information and the predicted value of the additional information and for variable-length code encoding the difference of the additional information, and a data encoding unit for encoding data of the pixels of the block.

These and other objects, features and advantages of the present invention will become more apparent in light of the following detailed description of best mode embodiments thereof, as illustrated in the accompanying drawings.

BRIEF DESCRIPTION OF THE DRAWINGS

FIGS. 4A, 4B, and 4C are schematic diagrams for explaining a class category prediction calculating portion according to the first embodiment and a second embodiment of the present invention;

DETAILED DESCRIPTION OF PREFERRED EMBODIMENTS

Figure 1:
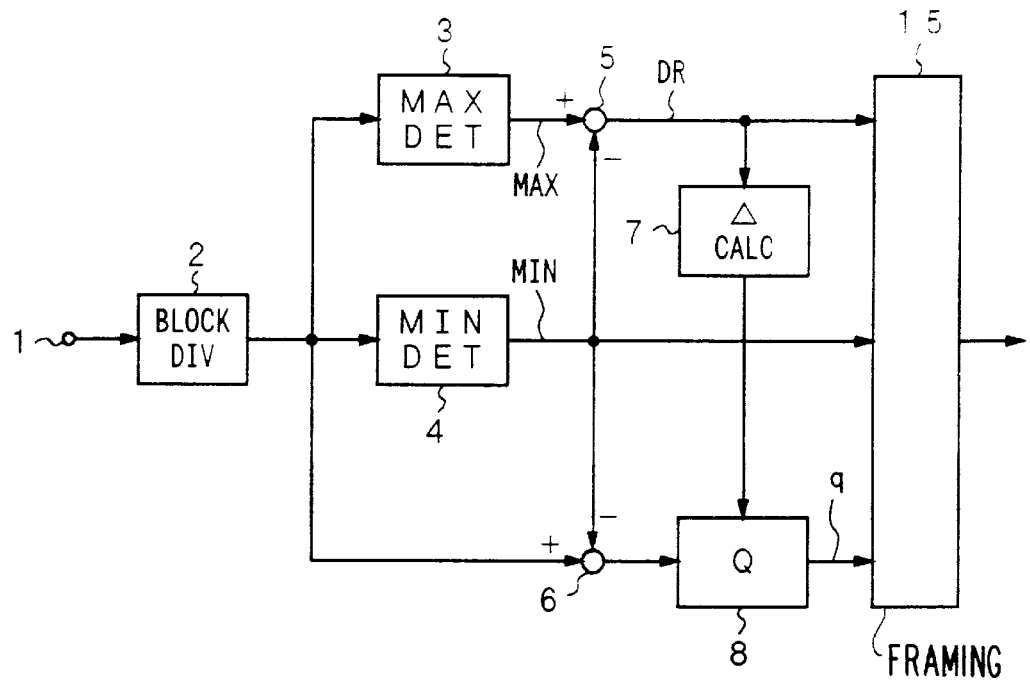
FIG. 1 is a block diagram showing a picture encoding apparatus corresponding to a conventional ADRC method.
Figure 2:
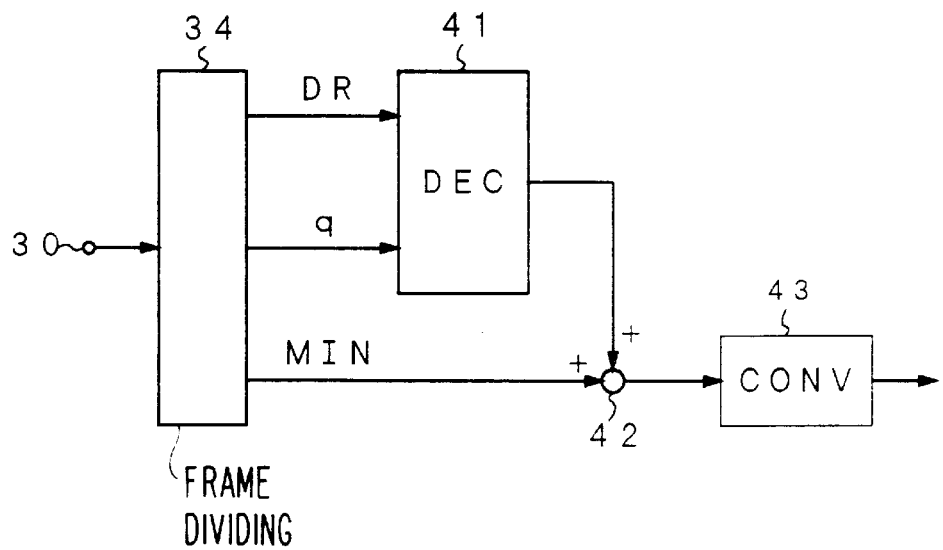
FIG. 2 is a block diagram showing a picture decoding apparatus corresponding to the conventional ADRC method.
Figure 3:
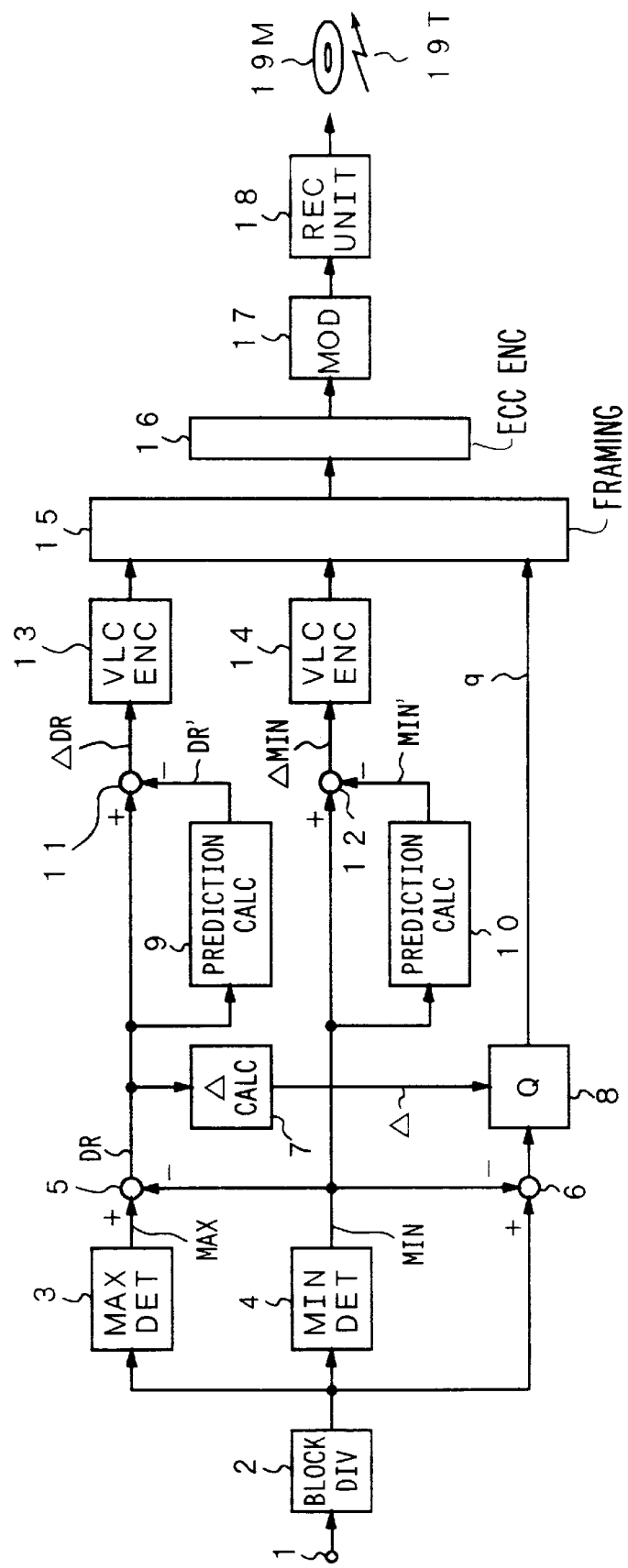
FIG. 3 is a block diagram showing a picture encoding apparatus according to a first embodiment of the present invention.

Next, with reference to the accompanying drawings, embodiments of the present invention will be described. FIG. 3 is a block diagram showing a picture encoding apparatus according to a first embodiment of the present invention. An input picture signal is supplied from an input terminal 1 to a block dividing portion 2. The block dividing portion 2 divides the input picture signal into blocks each of which is composed of (3×3) pixels. Pixel values of each block of (3×3) pixels are supplied to a maximum value detecting portion 3, a minimum value detecting portion 4, and a subtracting portion 6. The maximum value detecting portion 3 detects the maximum value of the levels of the pixel values of the block of (3×3) pixels. The detected maximum value MAX is supplied to a subtracting portion 5. The minimum value detecting portion 4 detects the minimum value of the levels of the pixel values of the block of (3×3) pixels. The detected minimum value MIN is supplied to the subtracting portion 5, the subtracting portion 6, a subtracting portion 12, and a class category prediction calculating portion 10.

The subtracting portion 5 subtracts the minimum value MIN from the maximum value MAX and generates a dynamic range DR. The dynamic range DR is supplied to a quantizing step width calculating portion 7, a class category prediction calculating portion 9, and a subtracting portion 11. The subtracting portion 6 subtracts the minimum value MIN from each of the pixel values of the block of (3×3) pixels supplied from the block dividing portion 2 and generates nine normalized pixel values. The normalized pixel values are supplied to a quantizing portion 8. The quantizing step width calculating portion 7 calculates a quantizing step width $\Delta$ corresponding to the supplied dynamic range DR and supplies the calculated quantizing step width $\Delta$ to the quantizing portion 8. The quantizing portion 8 quantizes each of the nine normalized pixel values with the supplied quantizing step width $\Delta$. Nine quantized values q of the block of (3×3) pixels are supplied to a framing portion 15.

The class category prediction calculating portion 9 obtains a predicted value DR' of the dynamic range corresponding to the supplied dynamic range DR. In this example, the dynamic range of n blocks prior is denoted by DRn. The class category prediction calculating portion 9 has a memory that stores predicting coefficients y1, y2, and y3 that have been learnt for each class. The class category prediction calculating portion 9 determines classes corresponding to patterns of dynamic ranges adjacent to the supplied dynamic range and reads the predicting coefficients y1, y2, and y3 corresponding to the classes. The class category prediction calculating portion 9 obtains a predicted value DR' of the dynamic range corresponding to the predicting coefficient and the supplied dynamic range DR.

Figures 4A, 4B, 4C:
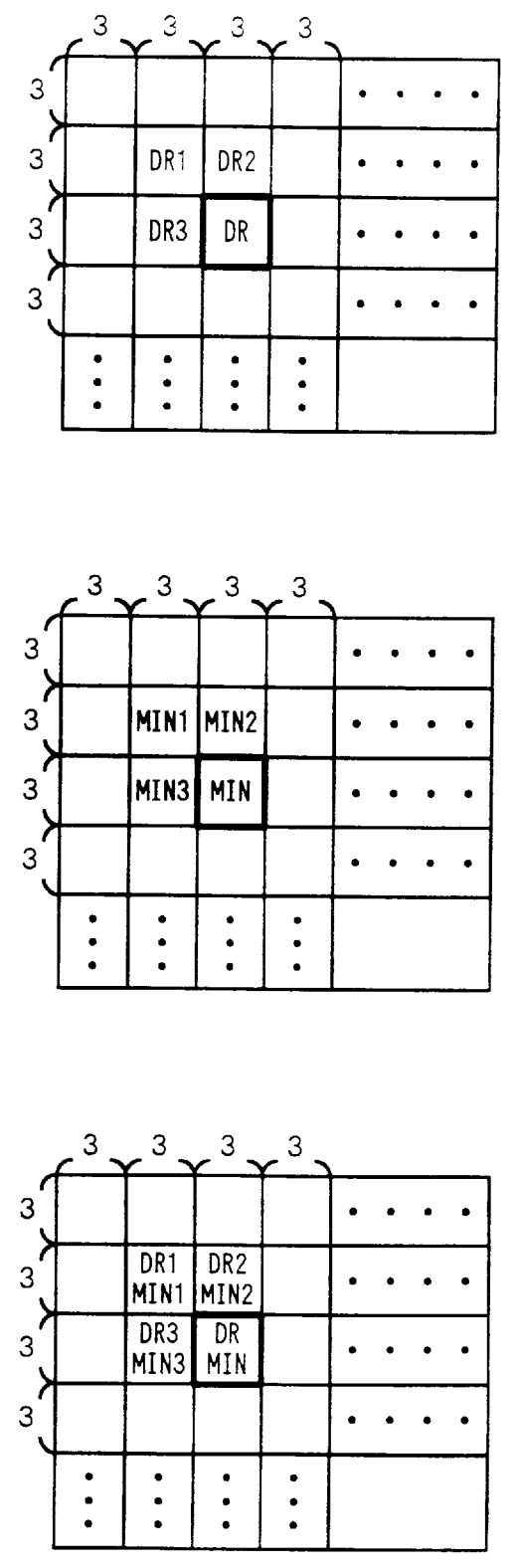

For example, when a predicted value DR' of the dynamic range corresponding to the dynamic range DR of a block surrounded by solid lines of FIG. 4A is obtained, a dynamic range DR2 of a block that is adjacently disposed above the target block, a dynamic range DR1 of a block that is adjacently disposed above and on the left of the target block (namely, a block adjacently disposed at the upper left diagonal position of the target block), and a dynamic range DR3 of a block that is adjacently disposed on the left of the target block are used. The class of the target block is determined corresponding to the patterns of the dynamic ranges DR1, DR2, and DR3 adjacent to the supplied dynamic range DR. The predicting coefficients y1, y2, and y3 that have been learnt corresponding to the classes are read from the memory. Thereafter, with the following formula (1), the predicted value DR' of the dynamic range is calculated.

$$DR' = y1 \times DR1 + y2 \times DR2 + y3 \times DR3 \quad (1)$$

Figure 5:
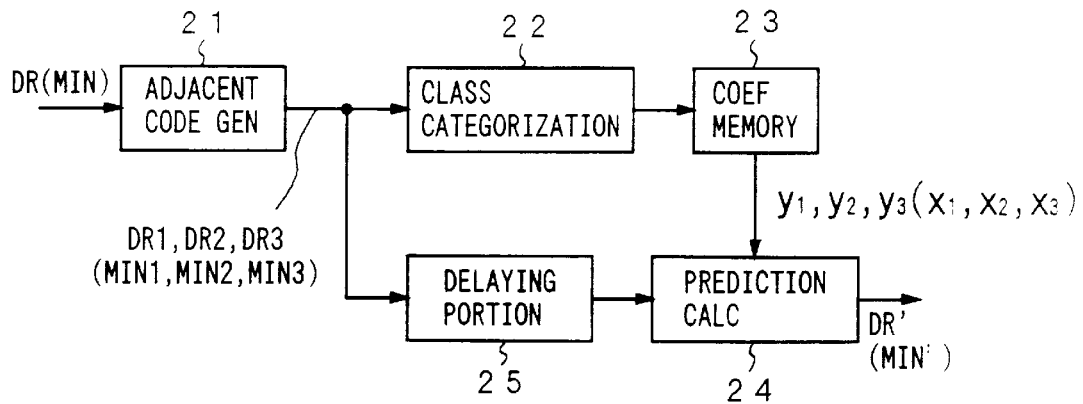
FIG. 5 is a block diagram showing a structure of the class category prediction calculating portion according to the first embodiment of the present invention.

Next, with reference to FIG. 5, the structure of the class category prediction calculating portion 9 will be described in detail. A dynamic range DR that is supplied to the class category prediction calculating portion 9 is supplied to an adjacent code value generating portion 21. As shown in FIG. 4A, the adjacent code value generating portion 21 supplies three adjacent dynamic ranges DR1, DR2, and DR3 of the dynamic range DR to a class categorizing portion 22. Before the dynamic range DR has been supplied, the dynamic ranges DR1, DR2, and DR3 have been supplied to the class category prediction calculating portion 9. Thus, the adjacent code value generating portion 21 has stored the dynamic ranges DR1, DR2, and DR3.

The class categorizing portion 22 detects patterns of the three dynamic ranges DR1, DR2, and DR3 and supplies class codes corresponding to the detected patterns to a predicting coefficient memory 23. The class categorizing portion 22 is composed of a 1-bit ADRC or the like. In this case, the class categorizing portion 22 outputs 3-bit class codes. The predicting coefficient memory 23 has stored predicting coefficients that have been learnt for each class. The predicting coefficient memory 23 supplies predicting coefficients y1, y2, and y3 corresponding to the address signals to a prediction calculating portion 24. In addition, the three dynamic ranges DR1, DR2, and DR3 are supplied to the prediction calculating portion 24 through a delaying portion 25. The prediction calculating portion 24 calculates a predicted value DR' of the dynamic range corresponding to the formula (1) with the predicting coefficients y1, y2, and y3 and the three dynamic ranges DR1, DR2, and DR3.

As shown in FIG. 3, the calculated predicted value DR' is supplied to the subtracting portion 11. The subtracting portion 11 subtracts the predicted value DR' of the dynamic range from the supplied dynamic range DR and obtains a difference signal $\Delta DR(=DR-DR')$ that is the result of the subtraction. Since the difference signal $\Delta R$ is the difference between the dynamic range DR and the predicted value DR' of the dynamic range, the signal concentrates at 0. The difference signal $\Delta R$ that concentrates at 0 is supplied to a variable-length code encoding portion 13. The variable-length code encoding portion 13 performs a variable-length code encoding process such as Huffman code encoding process or run-length code encoding process for the difference signal $\Delta R$ and generates a variable-length code. The variable-length code encoding portion 13 supplies the variable-length code to the framing portion 15.

The class category prediction calculating portion 10 obtains a predicted value MIN' of the minimum value with the supplied minimum value MIN. In this case, as an example, as with the above-described class category prediction calculating portion 9, the minimum value of n blocks prior is denoted by MINn. The class category prediction calculating portion 10 has a memory that stores predicting coefficients x1, x2, and x3 that have been learnt for each class. The class category prediction calculating portion 10 determines classes corresponding to patterns of minimum values adjacent to the supplied minimum value and reads predicting coefficients x1, x2, and x3 corresponding to the classes. The class category prediction calculating portion 10 obtains a predicted value MIN' of the supplied minimum value MIN corresponding to the read predicting coefficients and the supplied minimum value MIN.

For example, when the class category prediction calculating portion 10 obtains a predicted value MIN' of the minimum value corresponding to minimum values MIN of a block surrounded by solid lined of FIG. 4B, a minimum value MIN2 of a block adjacently disposed above the target block, a minimum value MIN1 of a block adjacently disposed above and on the left of the target block (namely, a block adjacently disposed at the upper left diagonal position of the target block), and a minimum value MIN3 of a block adjacently disposed on the left of the target block are used. The class category prediction calculating portion 10 determines classes corresponding to patterns of the adjacent minimum values MIN1, MIN2, and MIN3 of the minimum value MIN and reads predicting coefficients x1, x2, and x3 from the memory corresponding to the classes. The class category prediction calculating portion 10 calculates the predicted value MIN' of the minimum value corresponding to the following formula (2)

$$\text{MIN}' = x1 \times \text{MIN1} + x2 \times \text{MIN2} + x3 \times \text{MIN3} \quad (2)$$

Next, with reference to FIG. 5, the structure of the class category prediction calculating portion 10 will be described in detail. A minimum value MIN that is supplied to the class category prediction calculating portion 10 is supplied to an adjacent code value generating portion 21. As shown in FIG. 4B, the adjacent code value generating portion 21 supplies three minimum values MIN1, MIN2, and MIN3 disposed adjacent to the supplied minimum value MIN to a class categorizing portion 22. Before the minimum value MIN has been supplied, the minimum values MIN1, MIN2, and MIN3 have been supplied to the class category prediction calculating portion 10. Thus, the adjacent code value generating portion 21 has stored the minimum values MIN1, MIN2, and MIN3.

The class categorizing portion 22 detects patterns of the three minimum values MIN1, MIN2, and MIN3 and supplies class codes corresponding to the patterns to the prediction coefficient memory 23. The class categorizing portion 22 is composed of a 1-bit ADRC or the like. In this case, the class categorizing portion 22 outputs 3-bit class codes. The prediction coefficient memory 23 has stored predicting coefficients that have been learnt for individual classes. The predicting coefficient memory 23 supplies predicting coefficients x1, x2, and x3 corresponding to address signals of the supplied class codes to the prediction calculating portion 24. The three minimum values MIN1, MIN2, and MIN3 are supplied to the prediction calculating portion 24 through a delaying portion 25. The prediction calculating portion 24 calculates a predicted value MIN of the minimum value corresponding to the formula (2) with the predicting coefficients x1, x2, and x3 and the three minimum values MIN1, MIN2, and MIN3.

As shown in FIG. 3, the calculated predicted value MIN' is supplied to the subtracting portion 12. The subtracting portion 12 subtracts the predicted value MIN' of the minimum value from the minimum value MIN and obtains a difference signal ΔMIN (=MIN−MIN') as the result of the subtraction. Since the difference signal ΔMIN is the difference between the minimum value MIN and the predicted value MIN' of the minimum value, the signal concentrates at 0. The difference signal ΔMIN that concentrates at 0 is supplied to the variable-length code encoding portion 14. The variable-length code encoding portion 14 performs a variable-length code encoding process such as Huffman code encoding process or run-length code encoding process for the difference signal ΔMIN and generates a variable-length code. The variable-length code encoding portion 14 supplies the generated variable-length code to the framing portion 15.

The framing portion 15 frames the quantized values q supplied from the quantizing portion 8, the variable-length code of the difference signal ΔDR of the dynamic range DR supplied from the variable-length code encoding portion 13, and the variable-length code of the difference signal ΔMIN of the minimum value MIN supplied from the variable-length code encoding portion 14 and supplies the framed signal to an error correction code adding portion 16. The error correction code adding portion 16 adds an error correction code to the framed signal and supplies the resultant signal to a modulating portion 17. The modulating portion 17 modulates the signal supplied from the error correction code adding portion 16 corresponding to a modulating method such as EFM modulating method.

The modulated signal is supplied to a recording portion 18. The recording portion 18 records the modulated signal on a recording medium 19M such as a disc. When the modulated signal is transmitted through a transmission line 19T, in the present invention, a transmitting portion is used instead of the recording portion 18. The modulating portion 17 modulates the resultant framed signal corresponding to a proper modulating method and supplies the modulated signal to the transmission line 19T through the transmitting portion. Since many framing technologies and modulating technologies have been known, their description is omitted. In the present invention, any framing technology and any modulating technology can be used. With the above-described structure, since the additional codes are compressed, a picture signal that is highly compressed can be transmitted.

In the above-described embodiment, predicted values are independently obtained in such a manner that the class category prediction calculating portion 9 calculates a predicted value DR' of the dynamic range and that the class category prediction calculating portion 10 calculates a predicted value MIN' of the minimum value. However, with a correlation of the dynamic range DR and the minimum value MIN, the predicted value DR' of the dynamic range and the predicted value MIN' of the minimum value can be obtained.

Figure 6:
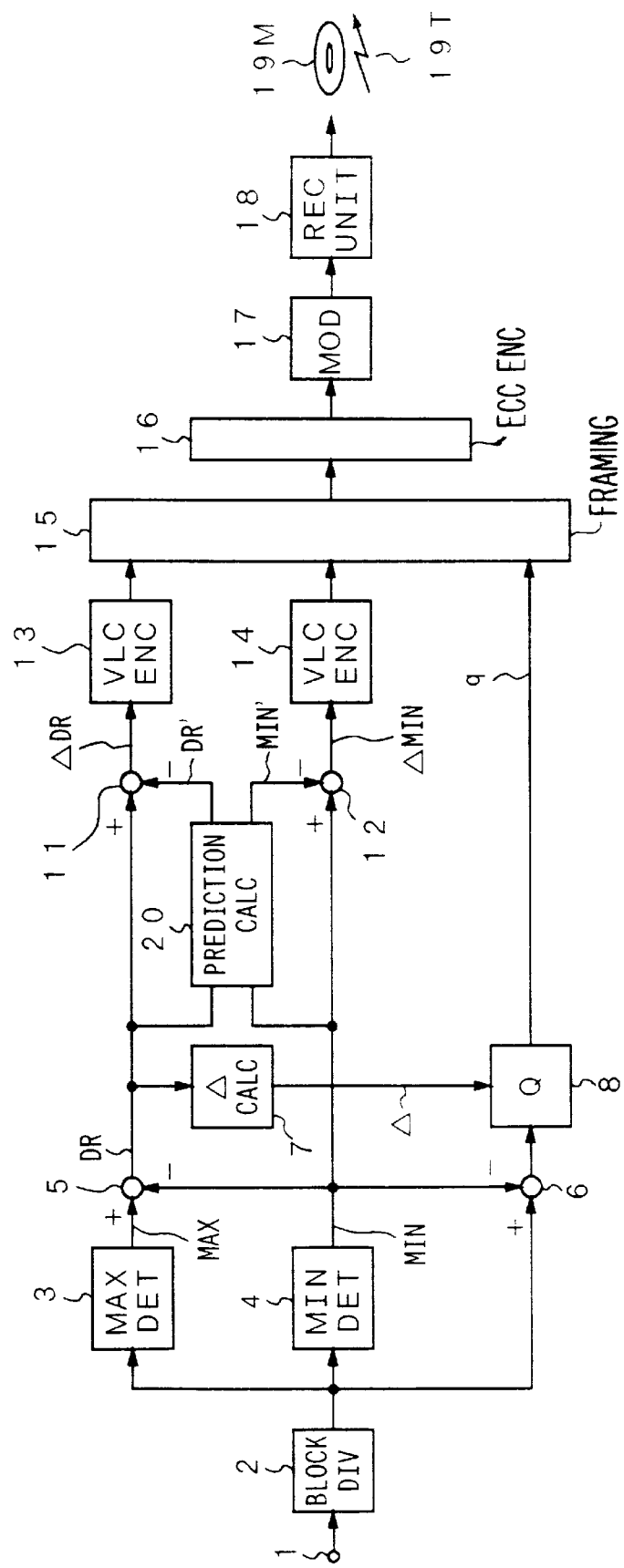
FIG. 6 is a block diagram showing a picture encoding apparatus according to the second embodiment of the present invention.

FIG. 6 is a block diagram showing a picture encoding apparatus according to a second embodiment of the present invention. In the second embodiment, with the correlation of the dynamic range DR and the minimum value MIN, a predicted value DR' of the dynamic value and a predicted value MIN' of the minimum value are obtained. In the second embodiment shown in FIG. 6, similar portions to those in the first embodiment are denoted by similar reference numerals and their description is omitted.

As shown in FIG. 6, a dynamic range DR and a minimum value MIN are supplied to a class category prediction calculating portion 20. The class category prediction calculating portion 20 calculates a predicted value DR' of the dynamic range and a predicted value MIN' of the minimum value with the correlation of the dynamic range DR and the minimum value MIN. In other words, the class category prediction calculating portion 20 calculates the predicted value DR' of the dynamic range corresponding to the following formula (3) and the predicted value MIN' of the minimum value corresponding to the following formula (4).

$$\text{DR}' = y1 \times \text{MIN1} + y2 \times \text{MIN2} + y3 \times \text{MIN3} + y4 \times \text{DR1} + y5 \times \text{DR2} + y6 \times \text{DR3} \quad (3)$$

$$\text{MIN}' = x1 \times \text{MIN1} + x2 \times \text{MIN2} + x3 \times \text{MIN3} + x4 \times \text{DR1} + x5 \times \text{DR2} + x6 \times \text{DR3} \quad (4)$$

However, in this case, as shown in FIG. 4C, MIN1 and DR1 are values of the same block; MIN2 and DR2 are values of the same block; and MIN3 and DR3 are values of the same block. The block positions of these pairs are the same as those of the first embodiment. In other words, the class category prediction calculating portion 20 has a memory that store predicting coefficients y1, y2, y3, y4, y5, and y6 that have been learnt for obtaining a predicted value DR' of the dynamic range and predicting coefficients x1, x2, x3, x4, x5, and x6 that have been learnt for obtaining a predicted value MIN' of the minimum value. The class category prediction calculating portion 20 determines classes corresponding to patterns of the dynamic ranges DR1, DR2, and DR3 and the minimum values MIN1, MIN2, and MIN3 adjacent to the supplied dynamic range and minimum value and reads the predicting coefficients y1, y2, y3, y4, y5, and y6 and the predicting coefficients x1, x2, x3, x4, x5, and x6 corresponding to the classes. With the read predicting coefficients (y1 to y6), the pre-supplied dynamic ranges DR (DR1 to DR3), and the pre-supplied minimum values MIN (MIN1 to MIN3), the class category prediction calculating portion 20 obtains the predicted value DR' of the dynamic range corresponding to the formula (3). In addition, with the read predicting coefficients (x1 to x6), the pre-supplied dynamic ranges DR (DR1 to DR3), and the pre-supplied minimum values MIN (MIN1 to MIN3), the class category prediction calculating portion 20 obtains the predicted value MIN' of the minimum value corresponding to the formula (4).

Figure 7:
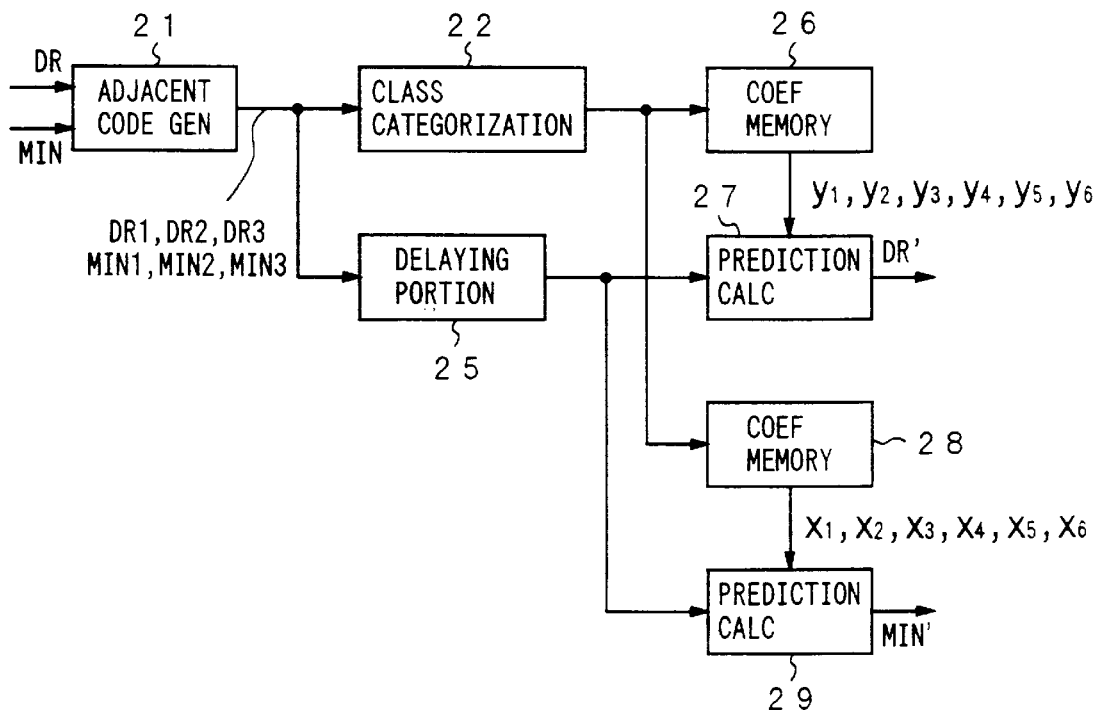
FIG. 7 is a block diagram showing a structure of a class category prediction calculating portion according to the second embodiment of the present invention.

Next, with reference to FIG. 7, the structure of the class category prediction calculating portion 20 will be described in detail. A dynamic range DR and a minimum value MIN that are supplied to a class category prediction calculating portion 20 are supplied to an adjacent code value generating portion 21. As shown in FIG. 4C, the adjacent code value generating portion 21 supplies three dynamic ranges DR1, DR2, and DR3 adjacent to the supplied dynamic range DR and thee minimum values MIN1, MIN2, and MIN3 adjacent to the supplied minimum value MIN to a class categorizing portion 22. Before the dynamic range DR and the minimum value MIN have been supplied, the dynamic ranges DR1, DR2, and DR3 and the minimum values MIN1, MIN2, and MIN3 have been supplied to the class category prediction calculating portion 20. Thus, the adjacent code value generating portion 21 has stored the dynamic ranges DR1, DR2, and DR3 and the minimum values MIN1, MIN2, and MIN3.

The class categorizing portion 22 detects patterns of the three dynamic ranges DR1, DR2, and DR3 and patterns of the three minimum values MIN1, MIN2, and MIN3 and supplies class codes corresponding to the patterns to a predicting coefficient memory 26 and a predicting coefficient memory 28. The class categorizing portion 22 is composed of a 1-bit ADRC or the like. In this case, the class categorizing portion 22 outputs 6-bit class codes. The predicting coefficient memory 26 has stored predicting coefficients that have been learnt for obtaining a predicted value DR' of the dynamic range for each class. The predicting coefficient memory 26 supplies the predicting coefficients y1, y2, y3, y4, y5, and y6 corresponding to address signals of the supplied class codes to a prediction calculating portion 27. In addition, the predicting coefficient memory 28 has stored predicting coefficients that have been learnt for obtaining a predicted value MIN' of the minimum value for each class. The predicting coefficient memory 28 supplies predicting coefficients x1, x2, x3, x4, x5, and x6 corresponding to address signals of the supplied class codes to a prediction calculating portion 29.

The three dynamic ranges DR1, DR2, and DR3 and the three minimum values MIN1, MIN2, and MIN3 are supplied to the prediction calculating portion 27 through a delaying portion 25. The prediction calculating portion 24 calculates a predicted value DR' of the dynamic range corresponding to the formula (3) with the predicting coefficients y1, y2, y3, y4, y5, and y6, the three dynamic ranges DR1, DR2, and DR3, and the three minimum values MIN1, MIN2, and MIN3. The three dynamic ranges DR1, DR2, and DR3 and the three minimum values MIN1, MIN2, and MIN3 are supplied to the prediction calculating portion 29 through the delaying portion 25. The prediction calculating portion 29 calculates a predicted value MIN' of the minimum value corresponding to the formula (4) with the predicting coefficients x1, x2, x3, x4, x5, and x6, the three dynamic ranges DR1, DR2, and DR3, and the three minimum values MIN1, MIN2, and MIN3. The calculated predicted value DR' of the dynamic range and the calculated predicted value MIN' of the minimum value are supplied to subtracting portions 11 and 12, respectively, as shown in FIG. 6.

In the first and second embodiments of the present invention, a variable-length code encoding process is performed for a difference signal $\Delta$DR of the dynamic range and a difference signal $\Delta$MIN of the minimum value. The resultant difference signal $\Delta$DR of the dynamic range and the resultant difference signal $\Delta$MIN of the minimum value are transmitted as additional codes along with nine quantized values q of each block of (3×3) pixels. However, the additional codes that are transmitted are not limited to the difference signal $\Delta$MIN of the minimum value and the difference signal $\Delta$DR of the dynamic range. Instead, a difference signal $\Delta$MAX of the maximum value and a difference signal $\Delta$MIN of the minimum value may be used as additional codes. Alternatively, a difference signal $\Delta$MAX of the maximum signal and a difference signal $\Delta$DR of the dynamic range may be used as additional codes. With the above-described structure, additional codes are compressed. Thus, a picture signal that is highly compressed can be transmitted.

Preferably, in the above-described first and second embodiments and other embodiments that will be described later, real values of additional codes are transmitted as initial data. In addition, real values of additional codes are periodically transmitted to prevent an error from being propagated.

Next, predicting coefficients used in the class category predicting calculating portions 9, 10, and 20 of the picture encoding apparatuses according to the first and second embodiments of the present invention will be described. The predicting coefficients used in the class category prediction calculating portions 9, 10, and 20 have been learnt. Next, the learning process for generating predicting coefficients for individual classes corresponding to the supplied dynamic range DR and the supplied minimum value MIN will be described. For simplicity, the method for generating predicting coefficients x1, x2, and x3 used by the class category prediction calculating portion 9 that obtains a predicted value DR' of the dynamic range will be described. The predicting coefficients x1, x2, and x3 corresponding to a linear combination model of the formula (1) are generated by the method of least squares. The method of least squares is applied in the following manner.

As a general example in the learning process, assuming that X is input data (DR1, DR2, and DR3 in the formula (1)), W is a predicting coefficient (x1, x2, and x3 in the formula (1)), and Y is a predicted value (DR' in the formula (1)), the following formula (5) is considered.

Observation equation:

$$XW = Y \tag{5}$$

$$X = \begin{bmatrix} x_{11} & x_{12} & \ldots & x_{1n} \\ x_{21} & x_{22} & \ldots & x_{2n} \\ \ldots & \ldots & \ldots & \ldots \\ x_{m1} & x_{m2} & \ldots & x_{mn} \end{bmatrix}, W = \begin{bmatrix} w_1 \\ w_2 \\ \ldots \\ w_n \end{bmatrix}, Y = \begin{bmatrix} y_1 \\ y_2 \\ \ldots \\ y_m \end{bmatrix} \tag{6}$$

The method of least squares is applied for data obtained by the observation equation. In the example of the formula (1), n is 3 and m is the number of data items learnt. With the observation equations of the formulas (5) and (6), a difference equation of the following formula (7) is considered.

$$XW = Y + E, \quad E = \begin{bmatrix} e_1 \\ e_2 \\ \ldots \\ e_m \end{bmatrix} \quad (7)$$

With the difference equation of the formula (7), the most probable value of each predicting coefficient wi is the minimum value of the sum of square of an error. The sum of square of an error is given by the following formula.

$$\sum_{i=1}^{m} e_i^2$$

In other words, the condition of the following formula (8) is considered.

$$e_1 \frac{\partial e_1}{\partial w_i} + e_2 \frac{\partial e_2}{\partial w_i} + \ldots + e_m \frac{\partial e_m}{\partial w_i} = 0 \quad (i = 1, 2, \ldots, n) \quad (8)$$

Considering the condition with respect to i of the formula (8), w1, w2, ..., wn that satisfy the condition is calculated. The following formula (9) is obtained from the formula (7) of the difference equation.

$$\frac{\partial e_i}{\partial w_1} = x_{i1}, \frac{\partial e_i}{\partial w_2} = x_{i2}, \ldots, \frac{\partial e_i}{\partial w_n} = x_{in} \quad (i = 1, 2, \ldots, m) \quad (9)$$

With the formulas (8) and (9), the following formula (10) is obtained.

$$\sum_{i=1}^{m} e_i x_{i1} = 0, \sum_{i=1}^{m} e_i x_{i2} = 0, \ldots, \sum_{i=1}^{m} e_i x_{in} = 0 \quad (10)$$

With the formulas (7) and (10), the following formula (11) is obtained as a normal equation.

$$\begin{cases} \left( \sum_{j=1}^{m} x_{j1} x_{j1} \right) w_1 + \left( \sum_{j=1}^{m} x_{j1} x_{j2} \right) w_2 + \ldots + \left( \sum_{j=1}^{m} x_{j1} x_{jn} \right) w_n = \left( \sum_{j=1}^{m} x_{j1} y_j \right) \\ \left( \sum_{j=1}^{m} x_{j2} x_{j1} \right) w_1 + \left( \sum_{j=1}^{m} x_{j2} x_{j2} \right) w_2 + \ldots + \left( \sum_{j=1}^{m} x_{j2} x_{jn} \right) w_n = \left( \sum_{j=1}^{m} x_{j2} y_j \right) \\ \vdots \\ \left( \sum_{j=1}^{m} x_{jn} x_{j1} \right) w_1 + \left( \sum_{j=1}^{m} x_{jn} x_{j2} \right) w_2 + \ldots + \left( \sum_{j=1}^{m} x_{jn} x_{jn} \right) w_n = \left( \sum_{j=1}^{m} x_{jn} y_j \right) \end{cases} \quad (11)$$

With the normal equation of the formula (11), the same number of equations as the number of unknowns can be obtained. Thus, the most probable value of each wi can be obtained. By the sweeping method (the method of elimination of Gauss-Jordan), simultaneous equations are solved. By the above-described method, predicting coefficients for individual classes are obtained.

Figure 8:
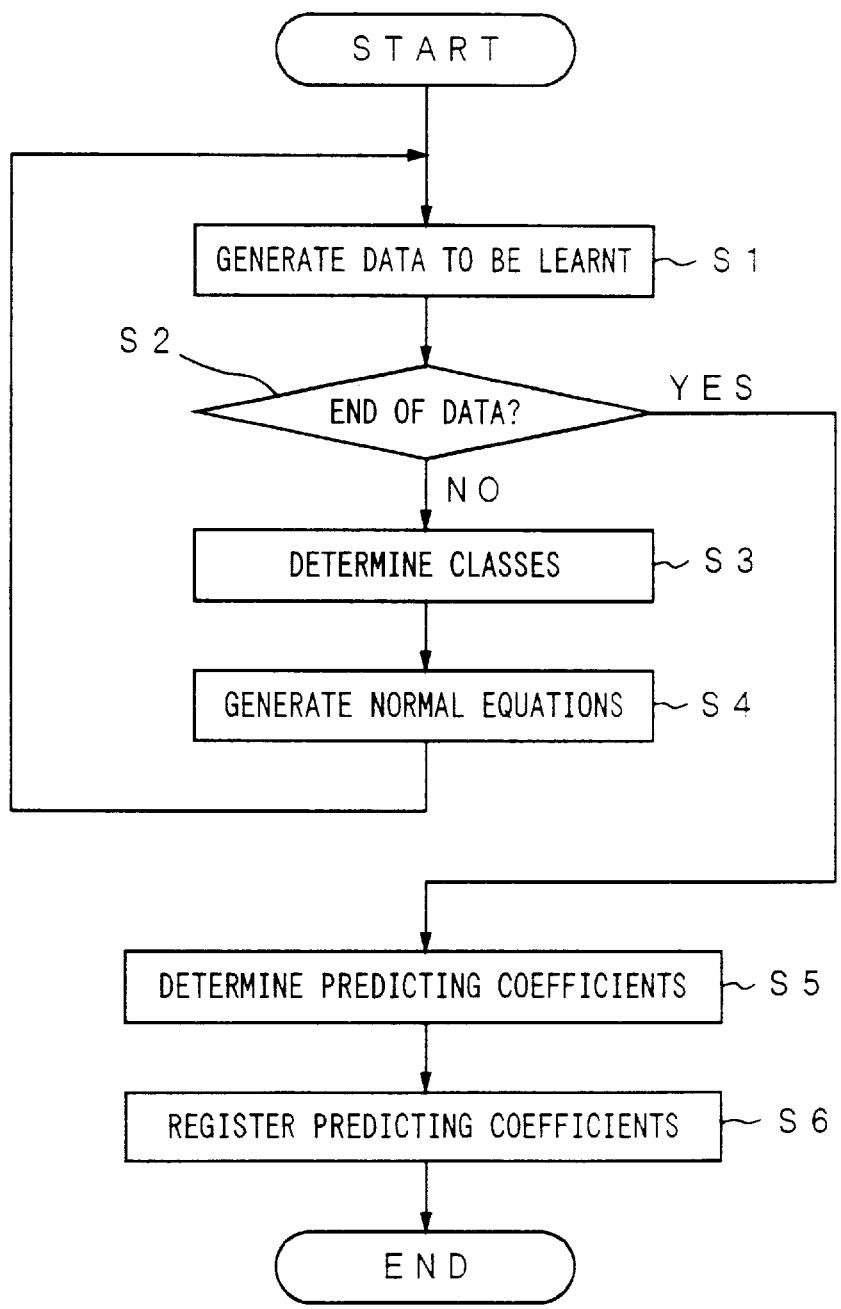
FIG. 8 is a flow chart showing an example of a learning process of the class category prediction calculating portion for coefficients.

Next, with reference to a flow chart shown in FIG. 8, a learning process that is performed by software corresponding to the method of least squares will be described. At step S1 "GENERATE DATA TO BE LEARNT.", data to be learnt corresponding to a known picture is generated to learn a predicting coefficient wi. In other words, in the first embodiment, when a predicted value DR' of the dynamic range is obtained, a dynamic range DR to be learnt is generated. When a predicted value MIN' of the minimum value is obtained, a minimum value MIN to be learnt is generated. In the second embodiment, both a dynamic range DR and a minimum value MIN are generated as data to be learnt. Thus, in the case that data to be learnt is generated, when a plurality of pictures rather than one picture is generated, predicting coefficients can be precisely obtained.

At step S2, it is determined whether or not the number of data items generated at step S1 is equal to the number of predicting coefficients. When the number of data items generated is less than the number of predicting coefficients, the flow advances to step S3. At step S3 "DETERMINE CLASSES.", classes of data to be learnt are categorized. Classes of data to be learnt are determined corresponding to three adjacent code values. The three adjacent code values are a value corresponding to a block adjacently disposed above the target block, a value corresponding to a block adjacently disposed above and on the left of the target block (namely, a block adjacently disposed at the upper left diagonal position of the target block), and a value corresponding to a block adjacently disposed on the left of the target block. In other words, the class category prediction calculating portion 9 uses the dynamic ranges DR of the blocks of the three adjacent positions. The class category prediction calculating portion 10 uses the minimum values MIN of the blocks of the three adjacent positions. The class category prediction calculating portion 20 uses the dynamic ranges DR and the minimum values MIN of the blocks of the three adjacent positions. Thereafter, the flow advances to step S4. At step S4 "GENERATE NORMAL EQUATIONS.", normal equations for individual classes are generated. At step "DATA END?", until the number of data items to be learnt becomes equal to the number of predicting coefficients, the process for generating normal equations is repeated.

When there is no data item to be learnt, the flow advances to step S5 "DETERMINE PREDICTING COEFFICIENTS." At step S5 "DETERMINE PREDICTING COEFFICIENTS.", normal equations of the formula (11) corresponding to many data items learnt for the individual classes are solved. In this example, as a solving method of the simultaneous equations, the above-described sweeping method is used. The predicting coefficients for the individual classes are registered to a storing portion such as a ROM at step S6 "REGISTER PREDICTING COEFFICIENTS." The addresses of the storing portion are divided corresponding to the classes. By the learning process, predicting coefficients of the class category adaptive prediction calculating portion is generated.

Figure 9:
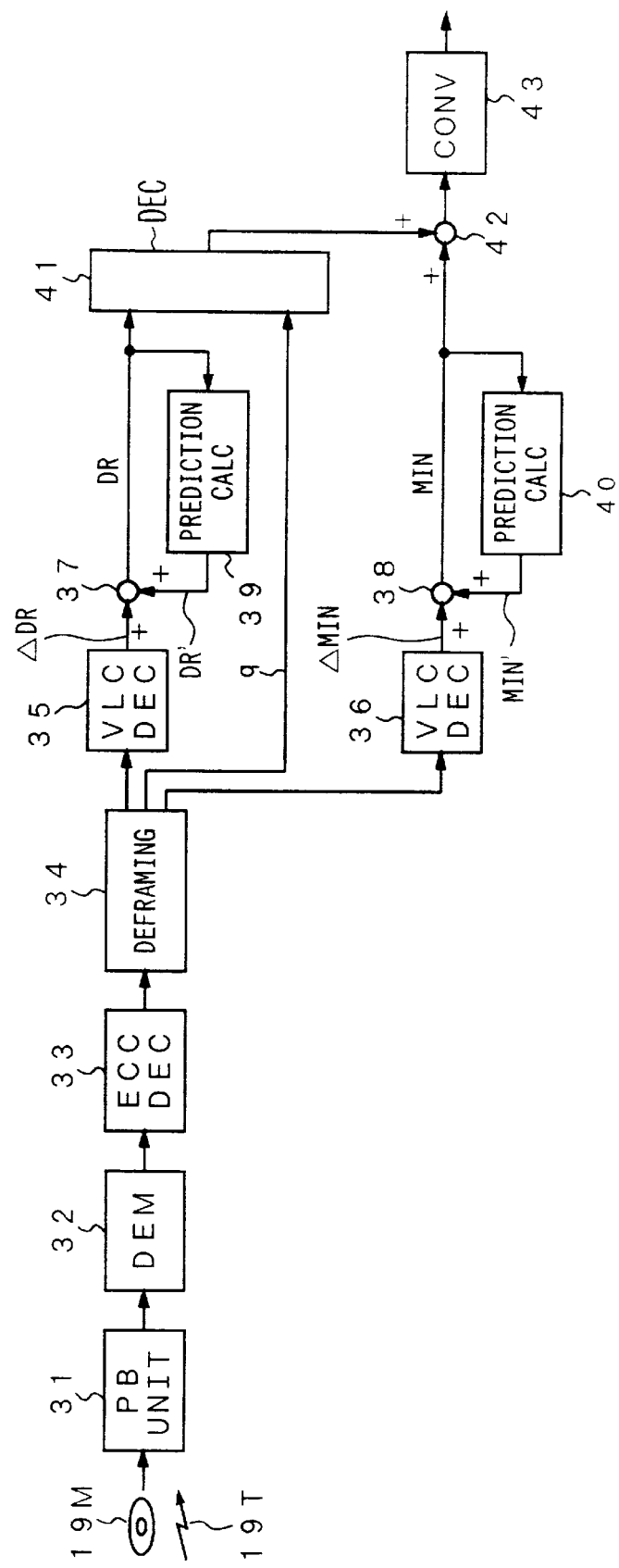
FIG. 9 is a block diagram showing a picture decoding apparatus according to the first embodiment of the present invention.

Next, a picture decoding apparatus corresponding to the picture encoding apparatus according to the first embodiment shown in FIG. 3 will be described. FIG. 9 is a block diagram showing the picture decoding apparatus according to the first embodiment. A reproducing portion 31 reproduces a signal recorded on a recording medium 19M and supplies the reproduced signal to a demodulating portion 32. When a signal is supplied from a transmission line 19T, a receiving portion instead of the reproducing portion 31 receives a signal transmitted from the transmission line 19T and supplies the received signal to the demodulating portion 32. The demodulating portion 32 demodulates the supplied signal by a demodulating method corresponding to the modulating method of the picture encoding apparatus and supplies the demodulated signal to an error correcting and error amending portion 33. The error correcting and error amending portion 33 corrects an error with an error correction code. When the error correcting and error amending portion 33 cannot correct an error, it amends the error. The resultant signal is supplied to a deframing portion 34.

The deframing portion 34 deframes the supplied signal into quantized values q, a variable-length code of a difference signal ΔDR of a dynamic range DR, and a variable-length code of a difference signal ΔMIN of a minimum value MIN. The quantized values q for each block of (3×3) pixels are supplied to a decoding portion 41. The variable-length code of the difference signal ΔDR of the dynamic range DR is supplied to a variable-length code decoding portion 35. The variable-length code of the difference signal ΔMIN of the minimum value MIN is supplied to a variable-length code decoding portion 36.

The variable-length code decoding portion 35 corresponds to the variable-length code encoding portion 13 shown in FIG. 3. The variable-length code decoding portion 35 performs a variable-length code decoding process (such as Huffman code decoding process or run-length code decoding process) for the variable-length code of the difference signal ΔDR of the supplied dynamic range and obtains the difference signal ΔDR of the dynamic range DR.

The difference signal ΔDR of the dynamic range DR is supplied to one terminal of an adding portion 37. The adding portion 37 adds a predicted value DR' of the dynamic range supplied to the other terminal thereof to the difference signal ΔDR of the supplied dynamic range DR and obtains the dynamic range DR. In other words, since the difference signal ΔDR of the dynamic range DR is the difference between the dynamic range DR and the predicted value DR' of the dynamic range, the dynamic range DR is obtained by adding the difference signal ΔDR of the dynamic range DR and the predicted value DR' of the dynamic range. The dynamic range DR obtained by the adding portion 37 is supplied to a class category prediction calculating portion 39 and a decoding portion 41.

The class category prediction calculating portion 39 obtains a predicted value DR' of the dynamic range with the supplied dynamic range DR. The structure of the class category prediction calculating portion 39 is the same as the structure of the class category prediction calculating portion 9 shown in FIG. 3. The class category prediction calculating portion 39 has a memory that has stored predicting coefficients y1, y2, and y3 that have been learnt for individual classes. The class category prediction calculating portion 39 determines classes corresponding to patterns of dynamic ranges DR1, DR2, and DR3 of adjacent positions of the supplied dynamic range and reads predicting coefficients y1, y2, and y3 corresponding to the classes. The class category prediction calculating portion 39 obtains a predicted value DR' of the dynamic range with the supplied dynamic range DR corresponding to the formula (1) with the read predicting coefficients y1, y2, and y3 and the pre-supplied dynamic ranges DR1, DR2, and DR3 and supplies the predicted value DR' of the dynamic range to the other terminal of the adding portion 37.

The variable-length code decoding portion 36 corresponds to the variable-length code encoding portion 14 shown in FIG. 3. The variable-length code decoding portion 36 performs a variable-length code decoding process (such as Huffman code decoding process or run-length code decoding process) for the variable-length code of the difference signal ΔMIN of the supplied minimum value MIN and obtains the difference signal ΔMIN of the minimum value MIN.

The difference signal ΔMIN of the minimum value MIN is supplied to one terminal of an adding portion 38. The adding portion 38 adds a predicted value MIN' of the minimum value supplied to the other terminal thereof to the difference signal ΔMIN of the supplied minimum value MIN and obtains the minimum value MIN. In other words, since the difference signal ΔMIN of the minimum value MIN is the difference between the minimum value MIN and the predicted value MIN' of the minimum value, the minimum value MIN is obtained by adding the difference signal ΔMIN of the minimum value MIN and the predicted value MIN' of the minimum value. The minimum value MIN obtained by the adding portion 38 is supplied to a class category prediction calculating portion 40 and an adding portion 42.

The class category prediction calculating portion 40 obtains the predicted value MIN' of the minimum value with the supplied minimum value MIN. The structure of the class category prediction calculating portion 40 is the same as the structure of the class category prediction calculating portion 10 shown in FIG. 3. The class category prediction calculating portion 40 has a memory that has stored predicting coefficients x1, x2, and x3 that have been learnt for individual classes. The class category prediction calculating portion 40 determines classes corresponding to the patterns of the minimum values MIN1, MIN2, and MIN3 at the adjacent positions of the supplied minimum value and reads predicting coefficients x1, x2, and x3 corresponding to the classes. With the read predicting coefficients x1, x2, and x3 and the pre-supplied minimum values MIN1, MIN2, and MIN3, the class category prediction calculating portion 40 obtains the predicted value MIN' of the minimum value with the supplied minimum value MIN corresponding to the formula (2). The predicted value MIN' of the minimum value is supplied to the other terminal of the adding portion 38.

The dynamic range DR and the quantized values q of each block of (3×3) pixels are supplied to the decoding portion 41. The decoding portion 41 dequantizes the quantized values corresponding to the dynamic range DR and supplies the dequantized values to the adding portion 42. The adding portion 42 adds the minimum value MIN to the dequantized values and obtains decoded pixel values of each block of (3×3) pixels. The decoded pixel values of the block of (3×3) pixels are supplied to a time sequence converting portion 43. The time sequence converting portion 43 converts the decoded pixel values of each block into decoded pixel values of the time sequence.

With the above-described structure, even if additional codes are compressed, a picture signal with a high picture quality can be obtained.

Figure 10:
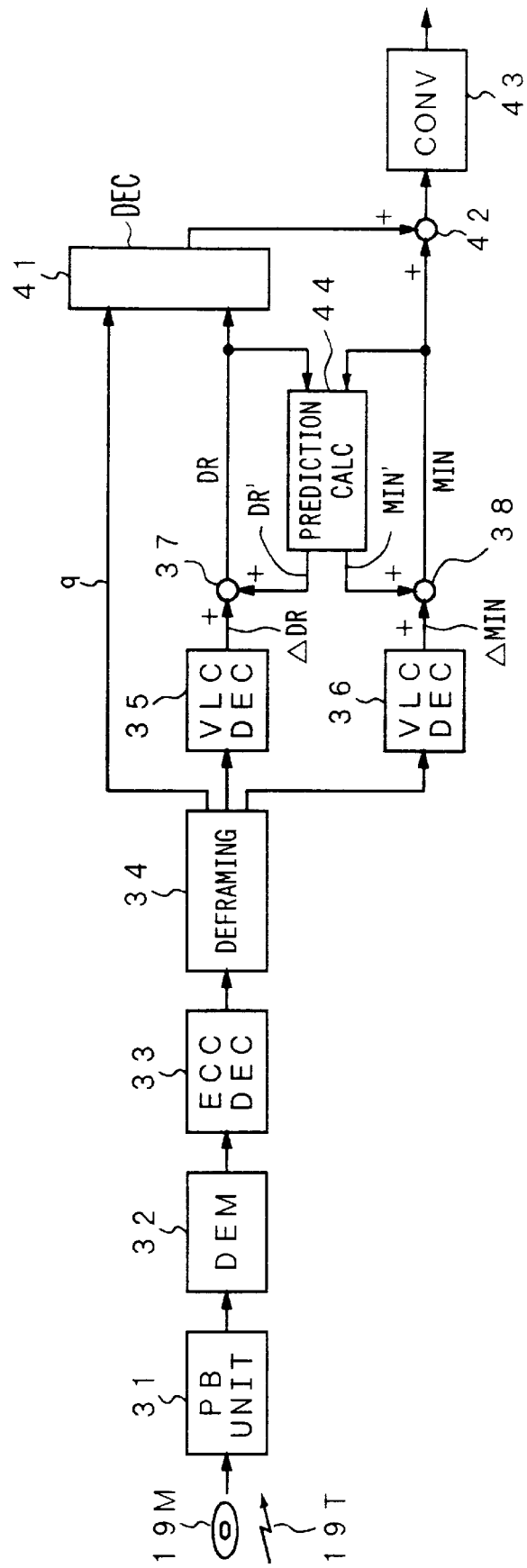
FIG. 10 is a block diagram showing a picture decoding apparatus according to the second embodiment of the present invention.

Next, a picture decoding apparatus corresponding to the picture decoding apparatus according to the second embodiment shown in FIG. 6 will be described. FIG. 10 is a block diagram showing the picture decoding apparatus according to the second embodiment of the present invention. For simplicity, in the picture decoding apparatus according to the second embodiment shown in FIG. 10, similar portions to those in the picture decoding apparatus according to the first embodiment shown in FIG. 9 are denoted by similar reference numerals and their description is omitted.

In FIG. 10, a difference signal ΔDR of a dynamic range DR supplied from a variable-length code decoding portion 35 is supplied to one terminal of an adding portion 37. The adding portion 37 adds a predicted value DR' of the dynamic range supplied to the other terminal thereof to the difference signal ΔDR of the supplied dynamic range DR and obtains the dynamic range DR. In other words, since the difference signal ΔDR of the dynamic range DR is the difference between the dynamic range DR and the predicted value DR' of the dynamic range DR', the dynamic range DR is obtained by adding the difference signal ΔDR of the dynamic range DR and the predicted value DR of the dynamic range. The dynamic range DR obtained by the adding portion 37 is supplied to a class category prediction calculating portion 44 and a decoding portion 41.

In addition, a difference signal ΔMIN of the minimum value MIN supplied from a variable-length code decoding portion 36 is supplied to one terminal of an adding portion 38. The adding portion 38 adds a predicted value MIN' of the minimum value supplied to the other terminal thereof to the difference signal ΔMIN of the supplied minimum value MIN and obtains the minimum value MIN. In other words, since the difference signal ΔMIN of the minimum value MIN is the difference between the minimum value MIN and the predicted value MIN' of the minimum value MIN, the minimum value MIN is obtained by adding the difference signal ΔMIN of the minimum value MIN and the predicted value MIN' of the minimum value. The minimum value MIN obtained by the adding portion 38 is supplied to the class category prediction calculating portion 44 and an adding portion 42.

With the correlation of the dynamic range DR and the minimum value MIN, the class category prediction calculating portion 44 obtains a predicted value DR' of the dynamic range and a predicted value MIN' of the minimum value. In addition, the structure of the class category prediction calculating portion 44 is the same as the structure of the class category prediction calculating portion 20 shown in FIG. 6. The class category prediction calculating portion 44 calculates a predicted value DR' of the dynamic range corresponding to the formula (3) and a predicted value MIN' of the minimum value corresponding to the formula (4).

In other words, the class category prediction calculating portion 44 has a memory that has stored predicting coefficients y1, y2, y3, y4, y5, and y6 that have been learnt for individual classes for obtaining a predicted value DR' of the dynamic range and predicting coefficients x1, x2, x3, x4, x5, and x6 that have been learnt for individual classes for obtaining a predicted value MIN' of the minimum value. The class category prediction calculating portion 44 determines classes corresponding to patterns of the dynamic ranges DR1, DR2, and DR3 and the minimum values MIN1, MIN2, and MIN3 at adjacent positions of the supplied dynamic range and supplied minimum value and reads predicting coefficients y1, y2, y3, y4, y5, and y6 and predicting coefficients x1, x2, x3, x4, x5, and x6 corresponding to the classes. With the read predicting coefficients (y1to y6), the pre-supplied dynamic ranges DR (DR1 to DR6), and the pre-supplied minimum values MIN (MIN1 to MIN3), the class category prediction calculating portion 44 obtains a predicted value DR' of the dynamic range corresponding to the formula (3). With the read predicting coefficients (x1 to x6), the pre-supplied dynamic ranges DR (DR1 to DR3), and the minimum values (MIN1 to MIN3), the class category prediction calculating portion 44 obtains a predicted value MIN' of the minimum value corresponding to the formula (4). The calculated predicted value DR' of the dynamic range is supplied to the other terminal of the adding portion 37. The calculated predicted value MIN' of the minimum value is supplied to the other terminal of the adding portion 38.

With the above-described structure, even if the additional codes are compressed, a picture signal with a high picture quality can be obtained.

Figure 11:
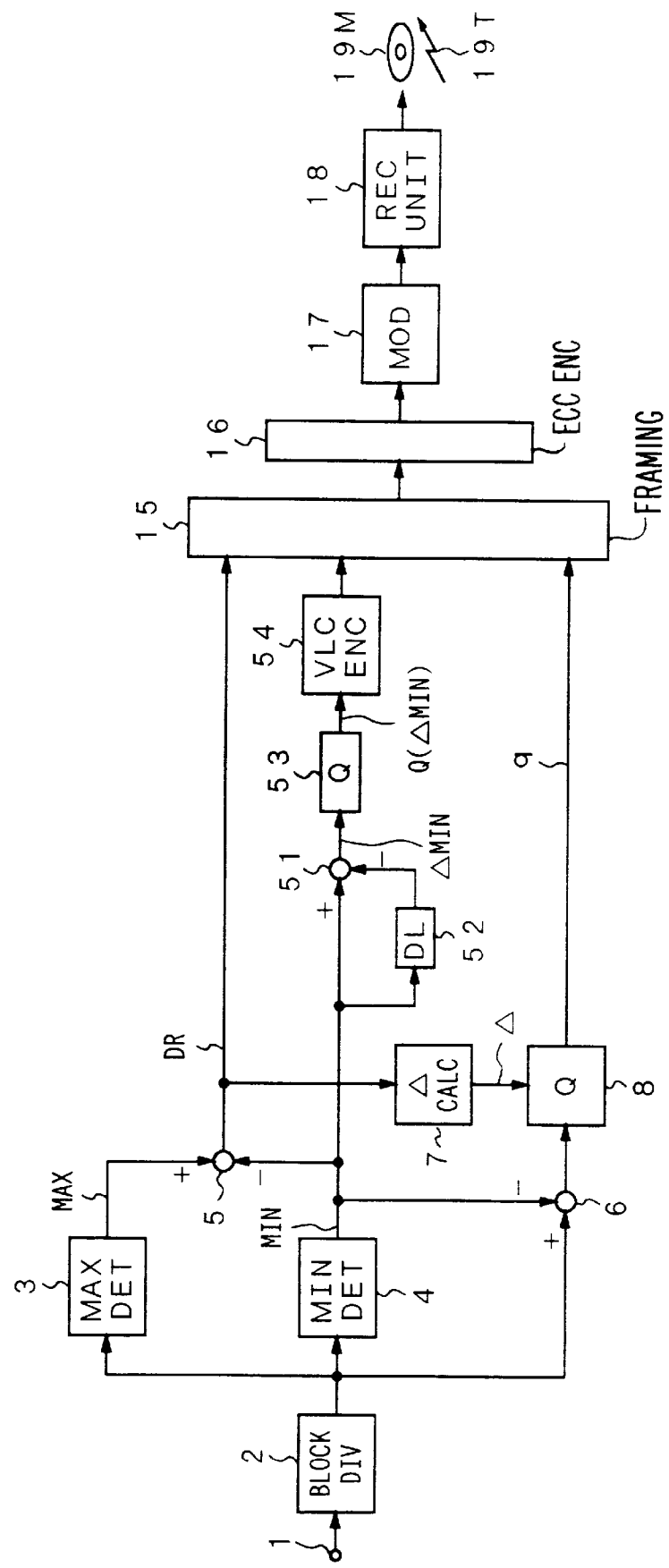
FIG. 11 is a block diagram showing a picture encoding apparatus according to a third embodiment of the present invention.

Next, a picture encoding apparatus according to a third embodiment of the present invention will be described. In the picture encoding apparatus according to the third embodiment, additional codes are compressed corresponding to the ADRC method. FIG. 11 is a block diagram showing the structure of the picture encoding apparatus according to the third embodiment of the present invention. An input picture signal is supplied from an input terminal 1 to a block dividing portion 2. The block dividing portion 2 divides the input picture signal into blocks each of which is composed of (3×3) pixels. Pixel values of each block of (3×3) pixels are supplied to a maximum value detecting portion 3, a minimum value detecting portion 4, and a subtracting portion 6. The maximum value detecting portion 3 detects the maximum value of the levels of the pixel values of each block of (3×3) pixels. The detected maximum value MAX is supplied to a subtracting portion 5. The minimum value detecting circuit 4 detects the minimum value of the levels of the pixel values of each block of (3×3) pixels. The detected minimum value MIN is supplied to the subtracting portion 5, the subtracting portion 6, a subtracting portion 51, and a delaying portion 52. The subtracting portion 5 generates a dynamic range DR with the detected maximum value MAX and the detected minimum value MIN. The dynamic range DR is supplied to a quantizing step width calculating portion 7 and a framing portion 15.

The subtracting portion 6 subtracts the minimum value MIN from the pixel values of the block of (3×3) pixels supplied from the input terminal 1 and generates nine normalized pixel values. The nine normalized pixel values are supplied to a quantizing portion 8. The quantizing step width calculating portion 7 calculates a quantizing step width Δ corresponding to the supplied dynamic range DR. The calculated quantizing step width Δ is supplied to the quantizing portion 8. The quantizing portion 8 quantizes the nine normalized pixel values with the quantizing step width Δ. The nine quantized values q are supplied to the framing portion 15.

The delaying portion 52 delays the minimum value MIN for one block and then supplies the resultant value to the subtracting portion 51. The subtracting portion 51 generates a difference signal for the minimum value MIN. The difference signal ΔMIN of the minimum value MIN is supplied to a quantizing portion 53. The quantizing portion 53 quantizes the difference signal ΔMIN of the minimum value MIN. The resultant difference signal Q (ΔMIN) of the minimum value MIN is supplied to a variable-length code encoding portion 54. The variable-length code encoding portion 54 performs a variable-length code encoding process (such as Huffman code encoding process or run-length code encoding process) for the difference signal Q (ΔMIN) of the minimum value MIN and generates a variable-length code. The variable-length code is supplied to the framing portion 15.

The framing portion 15 frames the quantized values q supplied from the quantizing portion 8, the dynamic range DR supplied from the subtracting portion 5, and the variable-length code of the quantized difference signal Q (ΔMIN) of the minimum value MIN supplied from the variable-length code encoding portion 53 and supplies the framed signal to an error correction code adding portion 16. The error correction code adding portion 16 adds an error correction code to the framed signal and supplies the resultant signal to a modulating portion 17. The modulating portion 17 modulates the supplied framed signal corresponding to the EFM modulating method or the like.

The modulated signal is supplied to a recording portion 18. The recording portion 18 records the modulated signal to a recording medium 19M such as a disc. When a modulated signal is transmitted through a transmission line 19T, a transmitting portion is used instead of the recording portion 18. The modulating portion 17 modulates the supplied framed signal corresponding to a proper modulating method and supplies the modulated signal to the transmission line 19T through the transmitting portion. Various framing technologies or various modulating technologies are known. Although the description of these technologies is omitted, any technology may be used.

In the picture encoding apparatus shown in FIG. 11, the quantized pixel values q of each block, the dynamic range DR, and the minimum value MIN that has been encoded with the variable-length code are transmitted. Since additional codes are compressed with such a structure, a picture signal that has been highly compressed can be transmitted.

Figure 12:
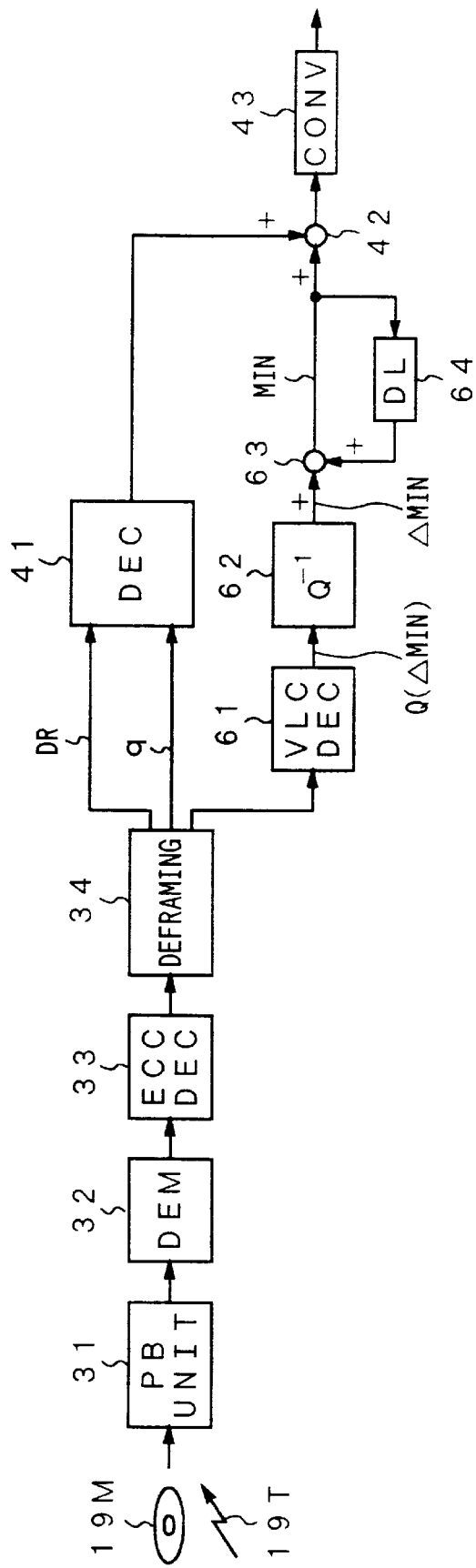
FIG. 12 is a block diagram showing a picture decoding apparatus according to the third embodiment of the present invention.

Next, a picture decoding apparatus corresponding to the picture encoding apparatus according to the third embodiment shown in FIG. 11 will be described. FIG. 12 is a block diagram showing the structure of the picture decoding apparatus according to the third embodiment of the present invention. In FIG. 12, a reproducing portion 31 reproduces a signal recorded on a recording medium 19M. The reproduced signal is supplied to a demodulating portion 32. When a signal is received from a transmission line 19T, a receiving portion instead of the reproducing portion 31 receives a signal from the transmission line 19T. The received signal is supplied to the demodulating portion 32. The demodulating portion 32 demodulates the supplied signal with to a demodulating method corresponding to a modulating method. The demodulated signal is supplied to an error correcting and error amending portion 33. The error correcting and error amending portion 33 corrects an error with an error correction code. When the error correction and error amending portion 33 cannot correct an error, it amends the error. The resultant signal is supplied to a deframing portion 34.

The deframing portion 34 deframes the supplied signal into quantized values q, a dynamic range DR, and a variable-length code of a quantized difference signal Q ($\Delta$MIN) of the minimum value MIN. The dynamic range DR is supplied to a decoding portion 41. The quantized pixel values Q of each block of (3×3) pixels are supplied to a decoding portion 41. The decoding portion 41 dequantizes the quantized pixel values q corresponding to the dynamic range DR. The dequantized pixel values are supplied to an adding portion 42.

On the other hand, the variable-length code of the quantized difference signal Q ($\Delta$MIN) of the minimum value MIN is supplied to a variable-length code decoding portion 61. The variable-length code decoding portion 61 corresponds to the variable-length code encoding portion 54 shown in FIG. 11. The variable-length code decoding portion 61 performs a variable-length code decoding process (such as Huffman code decoding process or run-length code decoding process) for the variable-length code of the quantized difference signal Q ($\Delta$MIN) of the minimum value MIN and obtains the quantized difference signal Q ($\Delta$MIN) of the minimum value MIN.

The quantized difference signal Q ($\Delta$MIN) of the minimum value MIN is supplied to a dequantizing portion 62. The dequantizing portion 62 corresponds to the quantizing portion 53 shown in FIG. 11. The dequantizing portion 62 dequantizes the quantized difference signal Q ($\Delta$MIN) of the minimum value MIN and obtains the difference signal $\Delta$MIN of the minimum value MIN. The difference signal $\Delta$MIN of the minimum value MIN is supplied to one terminal of an adding portion 63. The adding portion 63 adds the minimum value of one block prior supplied to the other terminal thereof to the difference signal $\Delta$MIN of the supplied minimum value MIN and obtains the minimum value MIN. In other words, since the difference signal $\Delta$MIN of the minimum value MIN is the difference between the minimum value MIN and the minimum value of one block prior, the minimum value is obtained by adding the difference signal $\Delta$MIN and the minimum value of one block prior. The minimum value MIN obtained by the adding portion 63 is supplied to a delaying portion 64 and an adding portion 42. The delaying portion 64 delays the minimum value MIN for one block and supplies the resultant signal to the adding portion 63.

The adding portion 42 adds the minimum value MIN to the dequantized values supplied from the decoding portion 41 and obtains decoded pixel values of the block of (3×3) pixels. The decoded pixel values of the block of (3×3) pixels are supplied to a time sequence converting portion 43. The time sequence converting portion 43 converts the decoded pixel values of each block into decoded pixel values of the time sequence.

With the above-described structure, even if additional codes are compressed, a picture signal with a high picture quality can be obtained.

Figure 13:
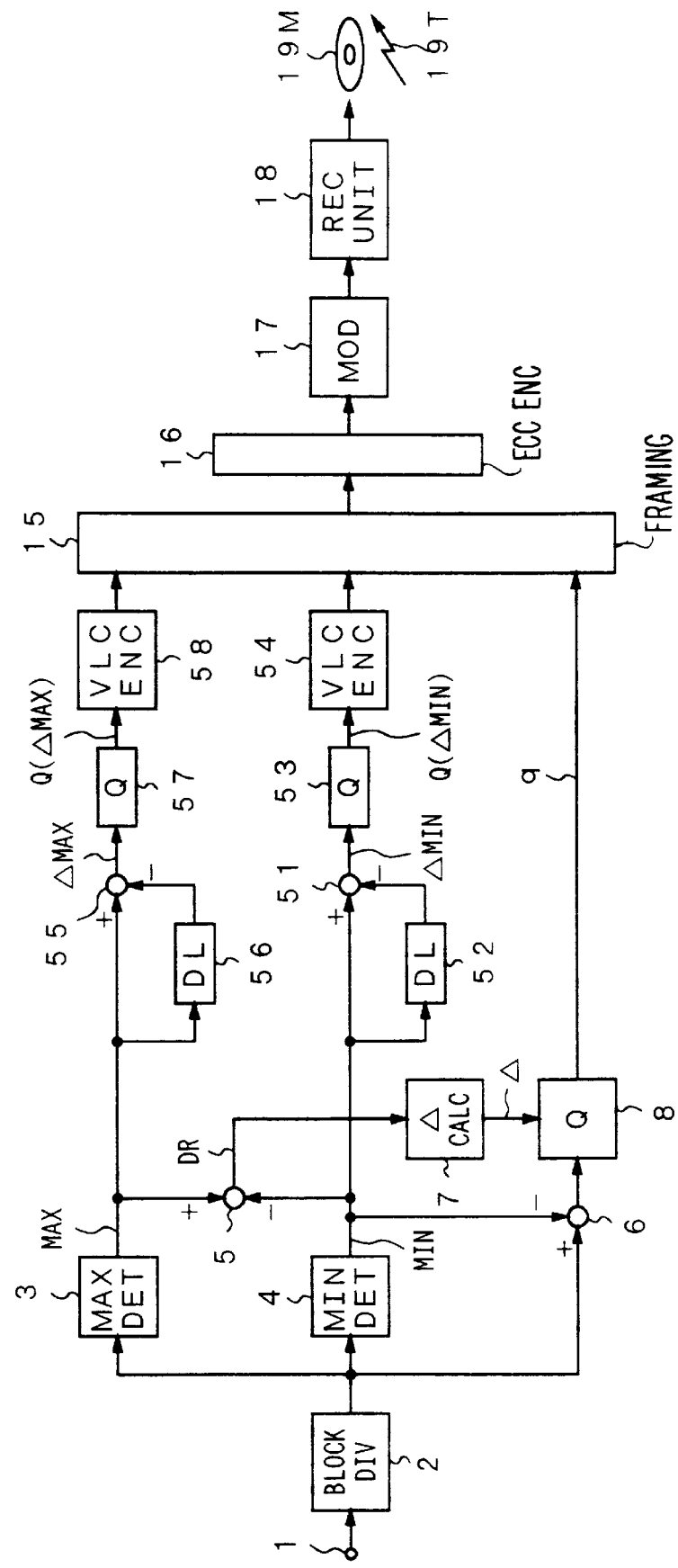
FIG. 13 is a block diagram showing a picture encoding apparatus according to a fourth embodiment of the present invention.

Next, a picture encoding apparatus according to a fourth embodiment of the present invention will be described. In the picture encoding apparatus according to the fourth embodiment, additional codes are compressed corresponding to the ADRC method. FIG. 13 is a block diagram showing the structure of the picture encoding apparatus according to the fourth embodiment of the present invention. An input picture signal is supplied from an input terminal 1 to a block dividing portion 2. The block dividing portion 2 divides the input picture signal into blocks, each of which is composed of (3×3) pixels. Pixel values of each block of (3×3) pixels are supplied to a maximum value detecting portion 3, a minimum value detecting portion 4, and a subtracting portion 6. The maximum value detecting portion 3 detects the maximum value of the levels of the pixel values of each block of (3×3) pixels. The detected maximum value MAX is supplied to a subtracting portion 5, a subtracting portion 55, and a delaying portion 56. The minimum value detecting portion 4 detects the minimum value of the levels of the pixel values of each block of (3×3) pixels. The detected minimum value MIN is supplied to the subtracting portion 5, the subtracting portion 6, a subtracting portion 51, and a delaying portion 52. The subtracting portion 5 generates a dynamic range DR with the detected maximum value MAX and the detected minimum value MIN. The dynamic range DR is supplied to a quantizing step width calculating portion 7.

The subtracting portion 6 subtracts the minimum value MIN from the pixel values of the block of (3×3) pixels supplied from the input terminal 1 and generates nine normalized pixel values. The normalized pixel values are supplied to a quantizing portion 8. The quantizing step width calculating portion 7 calculates a quantizing step width $\Delta$ corresponding to the supplied dynamic range DR and supplies the calculated quantizing step width Δ to the quantizing portion 8. The quantizing portion 8 quantizes the normalized pixel values with the supplied quantizing step width Δ. The quantized pixel values q are supplied to a framing portion 15.

The delaying portion 56 delays the maximum value MAX for one block and supplies the resultant value to the subtracting portion 55. The subtracting portion 55 generates a difference signal of the maximum value MAX. The generated difference signal ΔMAX of the maximum value MAX is supplied to a quantizing portion 57. The quantizing portion 57 quantizes the difference signal ΔMAX of the maximum value MAX and supplies the quantized difference signal Q (ΔMAX) of the maximum value MAX to a variable-length code encoding portion 58. The variable-length code encoding portion 58 performs a variable-length code encoding process (such as Huffman code encoding process or run-length code encoding process) for the quantized difference signal Q (ΔMAX) of the maximum value MAX and generates a variable-length code. The variable-length code is supplied to the framing portion 15.

The delaying portion 52 delays the minimum value MIN for one block. The resultant value is supplied to the subtracting portion 51. The subtracting portion 51 generates a difference signal for the minimum value MIN. The generated difference signal ΔMIN of the minimum value MIN is supplied to a quantizing portion 53. The quantizing portion 53 quantizes the difference signal of the minimum value MIN and supplies a quantized difference signal Q (ΔMIN) of the minimum value MIN to a variable-length code encoding portion 54. The variable-length code encoding portion performs a variable-length code encoding process (such as Huffman code encoding process or run-length code encoding process) for the quantized difference signal Q (ΔMIN) of the minimum value MIN and generates a variable-length code. The variable-length code is supplied to the framing portion 15.

The framing portion 15 frames the quantized pixel values q supplied from the quantizing portion 8, the variable-length code of the quantized difference signal Q (ΔMAX) of the maximum value MAX supplied from the variable-length code encoding portion 58, and the variable-length code of the quantized difference signal Q (ΔMIN) of the minimum value MIN supplied from the variable-length code encoding portion 54 and supplies the resultant framed signal to an error correcting code adding portion 16. Since the structures of the error correction code adding portion 16, a modulating portion 17, a recording portion 18, and a transmitting portion of the picture encoding apparatus shown in FIG. 13 are the same as the structures of the picture encoding apparatus shown in FIG. 11, their description is omitted.

The picture encoding apparatus shown in FIG. 13 transmits the quantized pixel values q and the maximum value MAX and minimum value MIN that have been encoded with variable-length code. Since additional codes are compressed with such a structure, a picture signal that is highly compressed can be transmitted.

Figure 14:
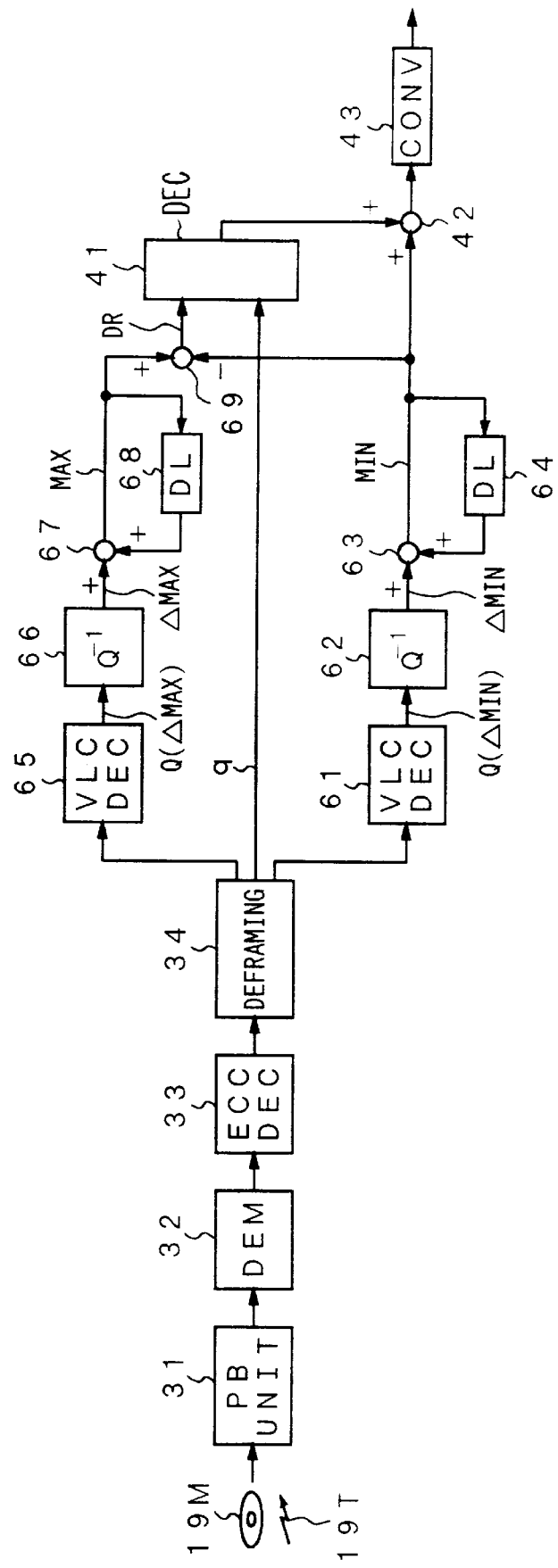
FIG. 14 is a block diagram showing a picture decoding apparatus according to the fourth embodiment of the present invention.

Next, a picture decoding apparatus corresponding to the picture encoding apparatus according to the fourth embodiment shown in FIG. 13 will be described. FIG. 14 is a block diagram showing the structure of the picture decoding apparatus according to the fourth embodiment. For simplicity, in the picture decoding apparatus of the fourth embodiment, similar portions to those of the third embodiment are denoted by similar reference numerals and their description is omitted. A deframing portion 34 deframes the input signal into quantized pixel values q, a variable-length code of a quantized difference signal Q (ΔMAX) of a maximum value MAX, and a variable-length code of a quantized difference signal Q (ΔMIN) of a minimum value MIN.

The variable-length code of the quantized difference signal Q (ΔMAX) of the maximum value MAX is supplied to a variable-length code decoding portion 65. The variable-length code decoding portion 65 corresponds to the variable-length code encoding portion 58 shown in FIG. 13. The variable-length code decoding portion 65 performs a variable-length code decoding process (such as Huffman code decoding process or run-length code decoding process) for the variable-length code of the quantized difference signal Q (ΔMAX) of the maximum value MAX and obtains the quantized difference signal Q (ΔMAX) of the maximum value MAX.

The quantized difference signal Q (ΔMAX) of the maximum value MAX is supplied to a dequantizing portion 66. The dequantizing portion 66 corresponds to the quantizing portion 57 shown in FIG. 13. The dequantizing portion 66 dequantizes the quantized difference signal Q (ΔMAX) of the maximum value MAX and obtains the difference signal ΔMAX of the maximum value MAX. The difference signal ΔMAX of the maximum value MAX is supplied to one terminal of an adding portion 67. The adding portion 67 adds the maximum value of one block prior supplied to the other terminal thereof to the difference signal ΔMAX of the maximum value MAX and obtains the maximum value MAX. In other words, since the difference signal ΔMAX of the maximum value MAX is the difference between the maximum value MAX and the maximum value of one block prior, the maximum value MAX is obtained by adding the difference signal ΔMAX and the maximum value of one block prior. The maximum value MAX obtained by the adding portion 67 is supplied to a delaying portion 68 and a subtracting portion 69. The delaying portion 68 delays the maximum value MAX for one block and supplies the resultant value to the adding portion 67.

On the other hand, the variable-length code of the quantized difference signal Q (ΔMIN) of the minimum value MIN is supplied to a variable-length code decoding portion 61. The variable-length code decoding portion 61 corresponds to the variable-length code encoding portion 54 shown in FIG. 13. The variable-length code decoding portion 61 performs a variable-length code decoding process (such as Huffman code decoding process or run-length code decoding process) for the variable-length code of the quantized difference signal Q (ΔMIN) of the minimum value MIN and obtains the quantized difference signal Q (ΔMIN) of the minimum value MIN.

The quantized difference signal Q (ΔMIN) of the minimum value MIN is supplied to a dequantizing portion 62. The dequantizing portion 62 corresponds to the quantizing portion 53 shown in FIG. 13. The dequantizing portion 62 dequantizes the quantized difference signal Q (ΔMIN) of the minimum value MIN and obtains the difference signal ΔMIN of the minimum value MIN. The difference signal ΔMIN of the minimum value MIN is supplied to one terminal of an adding portion 63. The adding portion 63 adds the minimum value of one block prior supplied to the other terminal thereof to the difference signal ΔMIN of the supplied minimum value MIN and obtains the minimum value MIN. In other words, since the difference signal ΔMIN of the minimum value MIN is the difference between the minimum value MIN and the minimum value one block prior, the minimum value MIN is obtained by adding the difference signal ΔMIN and the minimum value of one block prior. The minimum value MIN obtained by the adding portion 63 is supplied to a delaying portion 64, an adding portion 42, and the subtracting portion 69. The delaying portion 64 delays the minimum value MIN for one block and supplies the resultant value to the adding portion 63.

The subtracting portion 69 subtracts the minimum value MIN from the maximum value MAX and supplies the dynamic range that is the difference between the maximum value MAX and the minimum value MIN to a decoding portion 41. The dynamic range DR is supplied to the decoding portion 41. In addition, the quantized pixel values q of each block of (3×3) pixels are supplied to the decoding portion 41. The decoding portion 41 dequantizes the quantized pixel values q corresponding to the dynamic range DR and supplies the dequantized pixel values to the adding portion 42.

The adding portion 42 adds the minimum value MIN to the dequantized pixel values supplied from the decoding portion 41 and obtains decoded pixel values of each block of (3×3) pixels. The decoded pixel values of each block of (3×3) pixels are supplied to a time sequence converting portion 43. The time sequence converting portion 43 converts the decoded pixel values of each block into decoded pixel values of the time sequence.

With the above-described structure, even if additional codes are compressed, a picture signal with a high quality can be obtained.

Figure 15:
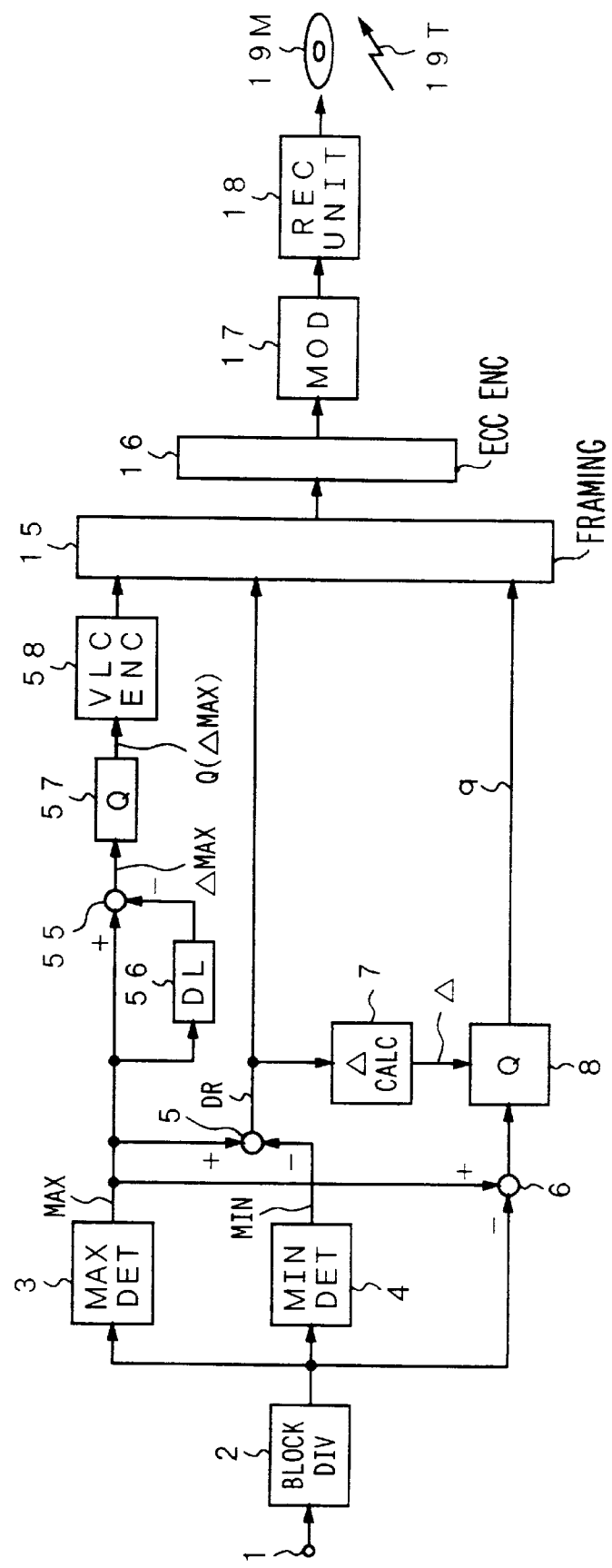
FIG. 15 is a block diagram showing a picture encoding apparatus according to a fifth embodiment of the present invention.

Next, a picture encoding apparatus according to a fifth embodiment of the present invention will be described. In the picture encoding apparatus according to the fifth embodiment, additional codes are encoded corresponding to the ADRC method. FIG. 15 is a block diagram showing the structure of the picture encoding apparatus according to the fifth embodiment of the present invention. An input signal is supplied from an input terminal 1 to a block dividing portion 2. The block dividing portion 2 divides the input picture signal into blocks, each of which is composed of (3×3) pixels. Pixel values of each block of (3×3) pixels are supplied to a maximum value detecting portion 3, a minimum value detecting portion 4, and a subtracting portion 6. The maximum value detecting portion 3 detects the maximum value of the levels of the pixel values of each block of (3×3) pixels. The detected maximum value MAX is supplied to subtracting portions 5, 6, and 55 and a delaying portion 56. The minimum value detecting portion 4 detects the minimum value of the levels of the pixel values of each block of (3×3) pixels. The detected minimum value MIN is supplied to the subtracting portion 5. The subtracting portion 5 generates a dynamic range DR with the detected maximum value MAX and the minimum value MIN. The dynamic range DR is supplied to a quantizing step width calculating portion 7 and a framing portion 15.

The subtracting portion 6 subtracts the pixel values of the block of (3×3) pixels supplied from the input terminal 1 from the maximum value MAX and generates nine normalized pixel values. The normalized pixel values are supplied to a quantizing portion 8. The quantizing step width calculating portion 7 calculates a quantizing step width Δ corresponding to the supplied dynamic range DR. The calculated quantizing step width Δ is supplied to a quantizing portion 8. The quantizing portion 8 quantizes the quantized pixel values with the supplied quantizing step width Δ. The quantized pixel values q are supplied to the framing portion 15.

The delaying portion 56 delays the maximum value MAX for one block. The resultant value is supplied to the subtracting portion 55. The subtracting portion 55 generates a difference signal of the maximum value MAX. The difference signal ΔMAX of the generated maximum value MAX is supplied to a quantizing portion 57. The quantizing portion 57 quantizes the difference signal ΔMAX of the maximum value MAX and supplies the quantized difference signal Q (ΔMAX) of the maximum value MAX to a variable-length code encoding portion 58. The variable-length code encoding portion 58 performs a variable-length code encoding process (such as Huffman code encoding process or run-length code encoding process) for the quantized difference signal Q (ΔMAX) of the maximum value MAX and generates a variable-length code. The variable-length code is supplied to the framing portion 15.

The framing portion 15 frames the quantized pixel values q supplied from the quantizing portion 8, the dynamic range DR supplied from the subtracting portion 5, and the variable-length code of the quantized difference signal Q (ΔMAX) of the maximum value MAX supplied from the variable-length code encoding portion 58. The framed signal is supplied to an error correction code adding portion 16. Since the structures of the error correction code adding portion 16, a modulating portion 17, a recording portion 18, and a transmitting portion of the picture encoding apparatus shown in FIG. 15 are the same as the structures of the picture encoding apparatus shown in FIG. 11, their description is omitted.

The picture encoding apparatus shown in FIG. 15 transmits the quantized pixel values q of each block, the dynamic range DR, and the difference signal of the maximum value MAX that has been encoded with the variable-length code. Since additional codes are compressed with such a structure, a picture signal that is highly compressed can be transmitted.

Figure 16:
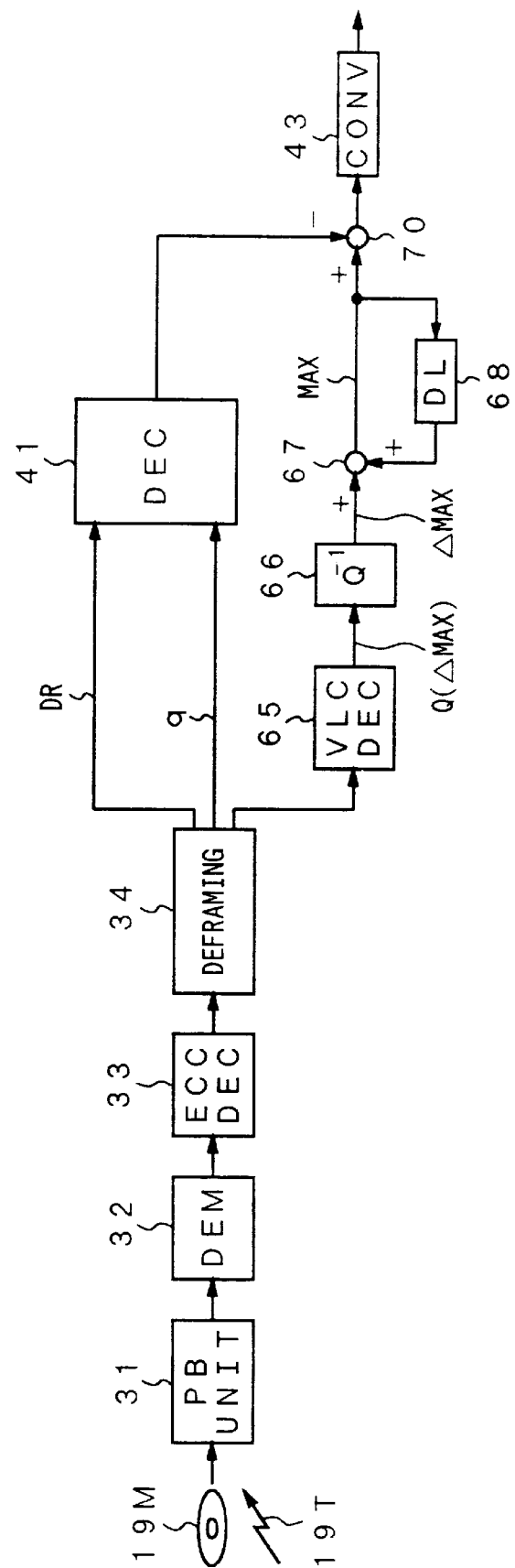
FIG. 16 is a block diagram showing a picture decoding apparatus according to the fifth embodiment of the present invention.

Next, a picture decoding apparatus corresponding to the picture encoding apparatus according to the fifth embodiment shown in FIG. 15 will be described. FIG. 16 is a block diagram showing the structure of the picture decoding apparatus according to the fifth embodiment of the present invention. For simplicity, in the picture decoding apparatus of the fifth embodiment, similar portions to those of the third embodiment are denoted by similar reference numerals and their description is omitted. A deframing portion 34 deframes the supplied signal into quantized pixel values q, a dynamic range DR, and a variable-length code of a quantized difference signal Q (ΔMAX) of a maximum value MAX.

The dynamic range DR is supplied to a decoding portion 41. The quantized pixel values q of each block of (3×3) pixels are supplied to the decoding portion 41. The decoding portion 41 dequantizes the quantized pixel values q corresponding to the dynamic range DR. The dequantized pixel values are supplied to a subtracting portion 70.

The variable-length code of the quantized difference signal Q (ΔMAX) of the maximum value MAX is supplied to a variable-length code decoding portion 65. The variable-length code decoding portion 65 corresponds to the variable-length code encoding portion 58 shown in FIG. 13. The variable-length code decoding portion 58 performs a variable-length code decoding process (such as Huffman code decoding process or run-length code decoding process) for the variable-length code of the quantized difference signal Q (ΔMAX) of the maximum value MAX and obtains the quantized difference signal Q (ΔMAX) of the maximum value MAX.

The quantized difference signal Q (ΔMAX) of the maximum value MAX is supplied to a dequantizing portion 66. The dequantizing portion 66 corresponds to the quantizing portion 57 shown in FIG. 15. The dequantizing portion 66 dequantizes the quantized difference signal Q (ΔMAX) of the maximum value MAX and obtains the difference signal ΔMAX of the maximum value MAX. The difference signal ΔMAX of the maximum value MAX is supplied to one terminal of an adding portion 67. The adding portion 67 adds the maximum value of one block prior supplied to the other terminal thereto to the difference signal ΔMAX of the supplied maximum value MAX and obtains the maximum value MAX. In other words, since the difference signal ΔMAX of the maximum value MAX is the difference between the maximum value MAX and the maximum value of one block prior, the maximum value MAX is obtained by adding the difference signal ΔMAX and the maximum value of one block prior. The maximum value MAX obtained by the adding portion 67 is supplied to a delaying portion 68 and a subtracting portion 70. The delaying portion 68 delays the maximum value MAX for one block and supplies the resultant value to the adding portion 67.

The subtracting portion 70 subtracts the dequantized values supplied from the decoding portion 41 from the maximum value MAX and obtains decoded pixel values of the block of (3×3) pixels. The decoded pixel values of the block of (3×3) pixels are supplied to a time sequence converting portion 43. The time sequence converting portion 43 converts decoded pixel values of each block into decoded pixel values of the time sequence.

With the above-described structure, even if additional codes are compressed, a picture signal with a high quality can be obtained.

In the above-described third, fourth, and fifth embodiments of the present invention, the difference with each of the maximum value MAX and the minimum value MIN is quantized and then a variable-length code encoding process is performed for the quantized results. However, such a process is not performed for the dynamic range. This is because the maximum value MAX and the minimum value MIN of each block has a correlation. However, the dynamic range DR of each block does not have a proper correlation. Thus, in the above-described third, fourth, and fifth embodiments, such a process is not performed. However, the process performed for the maximum value MAX and the minimum value MIN can be performed for the dynamic range DR.

When the compression encoding process is used for reducing the information amount, reproduced picture data obtained by a decoding apparatus does not always accord with original picture data. However, the visual deterioration of the resultant reproduced picture data can be reduced.

In addition, the present invention can be applied for a quantizing process for quantizing a difference signal generated by a prediction encoding process other than those described in the above-described embodiments. Moreover, the present invention can be applied for an apparatus that has a buffering structure for controlling a quantizing step width so as to control the amount of data generated.

In the above-described embodiments, the variable-length code encoding process is performed for the difference signal of the minimum value MIN and the difference signal of the dynamic range DR. However, when a picture encoding apparatus and a picture decoding apparatus uses a DCT (Discrete Cosine Transform) method and a quantizing process, the difference signal of a DC component of each block is obtained. Thereafter, the variable-length code encoding process for the difference signal is performed. When a picture encoding apparatus and a picture decoding apparatus uses a GBTC (Global Block Truncation Coding) method, the difference signal of the average value of each block and the difference signal of the standard deviation thereof are obtained. Thereafter, the variable-length code encoding process is performed for the difference signals. When a picture encoding apparatus and a picture decoding apparatus use a vector quantizing method, the difference signal of a code transmitted for each block is obtained. Thereafter, the variable-length code encoding process is performed for the difference signal.

In the picture encoding apparatus shown in FIG. 11, the subtracting portion 6 subtracts the minimum value from each pixel value. Instead, the subtracting portion 6 may subtract each pixel value from the maximum value MAX. In addition, in the example shown in FIG. 15, the subtracting portion 6 may subtract the minimum value MIN from each pixel value.

Moreover, the block dividing portion according to the present invention divides an input picture signal into two-dimensional blocks each of which is composed of (3×3) pixels. However, the present invention is not limited to such a block structure. Instead, each block may be composed of other than (3×3) pixels. For example, an input picture signal may be composed of three-dimensional blocks.

Furthermore, according to the present invention, the difference of adjacent blocks for important data is obtained and the resultant difference signal is compressed and encoded. However, the present invention is not limited to such a method. Instead, the difference between adjacent pixels is obtained. Thereafter, the resultant difference signal is compressed and encoded.

Moreover, according to the present invention, a predicting coefficient memory that stores predicting coefficients for individual classes is disposed. In addition, a prediction calculating portion that performs a prediction calculating operation with predicting coefficients stored in the predicting coefficient memory and adjacent code values is disposed. A predicted value corresponding to the input code value is output. However, the present invention is not limited to such a structure. Instead of the predicting coefficient memory and the prediction calculating portion, a predicted value memory that stores predicted values for individual classes may be disposed. In this case, the predicted values stored in the predicted value memory have been learnt. The predicted values correspond to the output values of the class category predicting portion.

Such methods have been proposed in Japanese Patent Laid-Open Publication No. 5-328185 and U.S. patent application Ser. No. 08/061,730 filed on May 17, 1993. As a real method for obtaining predicted values, a learning method using weighted averages is known. As another method, a learning method using a normalizing process is known.

According to the present invention, by compressing important data of each block, a picture signal can be highly compressed. In addition, the same quality as the data structure of which the important data is not compressed is accomplished.

In addition, by obtaining the difference between adjacent pixels for important data of each block, a difference signal is obtained. After the distribution range of the levels of the difference signals is narrowed, the difference signals are compressed and encoded. Thus, the compressing efficiency can be improved.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. A picture encoding apparatus for encoding an input digital picture signal in such a manner that the amount of generated data is reduced, comprising:

a dividing unit for dividing the input digital picture signal into a plurality of blocks composed of a plurality of pixels;

a detecting unit for providing for each block a value based on said plurality of pixels;

a generating unit including an adjacent code generator for generating additional values that are adjacent to said value, said generating unit further including a class categorizer for supplying a class code corresponding to the generated additional values, said generating unit further including a memory for outputting predetermined predicting coefficients in response to the supplied class code, said generating unit further including a prediction calculator for predicting said value as a function of said predetermined predicting coefficients to provide a predicted value; and an encoding unit for generating a difference value between said value and said predicted value.

2. The apparatus according to claim 1, further comprising a data encoding unit for encoding the pixels.

3. A picture encoding and transmitting method for encoding an input digital picture signal in such a manner that the amount of generated data is reduced and for transmitting the encoded input digital picture signal, comprising the steps of:

dividing said input digital picture signal into a plurality of blocks composed of a plurality of pixels;

providing for each block a value based on said plurality of pixels;

generating additional values that are adjacent to said value;

supplying a class code corresponding to the generated additional values;

outputting predetermined predicting coefficients in response to the supplied class code;

predicting said value as a function of said predetermined predicting coefficients to provide a predicted value;

generating a difference value between said value and said predicted value; and transmitting the generated difference value.

4. The method according claim 3, further comprising encoding the pixels to generate an encoded signal, and transmitting the generated encoded signal.

5. A picture encoding method for encoding an input digital picture signal in such a manner that the amount of generated data is reduced, comprising the steps of:

dividing said input digital picture signal into a plurality of blocks composed of a plurality of pixels;

providing for each block a value based on said plurality of pixels;

generating additional values that are adjacent to said value;

supplying a class code corresponding to the generated additional values;

outputting predetermined predicting coefficients in response to the supplied class code;

predicting said value as a function of said predetermined predicting coefficients to provide a predicted value; and generating a difference value between said value and said predicted value.

6. The method according to claim 5, further comprising encoding the pixels.

7. A picture recording medium for recording an encoded signal in such a manner that the amount of data generated from an input digital picture signal is reduced, the generated data on said picture recording medium being prepared by:

dividing said input digital picture signal into a plurality of blocks composed of a plurality of pixels;

providing for each block a value based on said plurality of pixels;

generating additional values that are adjacent to said value;

supplying a class code corresponding to the generated additional values;

outputting predetermined predicting coefficients in response to the supplied class code;

predicting said value as a function of said predetermined predicting coefficients to provide a predicted value; and generating a difference value between said value and said predicted value.

8. The picture recording medium according to claim 7, wherein the generated data is further prepared by encoding the pixels.

9. A picture decoding apparatus for decoding an encoded picture signal obtained by encoding a plurality of pixels of a block, comprising:

a receiving unit for receiving a difference value between a value based on said plurality of pixels and a corresponding to said value;

a generating unit including an adjacent code generator for generating additional values that are adjacent to said value, said generating unit further including a class categorizer for supplying a class code corresponding to the generated additional values, said generating unit further including a memory for outputting predetermined predicting coefficients in response to the supplied class code, said generating unit further including a prediction calculator for predicting said value as a function of said predetermined predicting coefficients; and an adding unit for generating said value using said difference value and said predicted value.

10. The apparatus according to claim 9, wherein said receiving unit receives said encoded picture signal in which the pixels have been encoded, said apparatus further comprising a decoding unit for decoding the received encoded picture signal corresponding to said value generated by said adding unit and for generating the pixel values.

11. A picture decoding method for decoding an encoded picture signal obtained by encoding a plurality of pixels of a block, comprising the steps of:

receiving a difference value between a value based on said plurality of pixels and a predicted value corresponding to said value;

decoding the encoded difference value to generate said difference value;

generating additional values that are adjacent to said value;

supplying a class code corresponding to the generated additional values;

outputting predetermined predicting coefficients in response to the supplied class code;

predicting said value as a function of said predetermined predicting coefficients; and generating said value using said difference value and said predicted value.

12. The method according to claim 11, further comprising receiving said encoded picture signal in which the block pixels have been encoded, decoding the received encoded picture signal corresponding to said value generated from said difference and predicted values, and generating the pixel values.

* * * * *